(12) United States Patent
Kim et al.

(10) Patent No.: US 12,086,354 B2
(45) Date of Patent: Sep. 10, 2024

(54) ANALOG FRONT END AND TOUCH DISPLAY DEVICE

(71) Applicant: LG DISPLAY CO., LTD., Seoul (KR)

(72) Inventors: Beom-Jin Kim, Seoul (KR); HyeongWon Kang, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/196,495

(22) Filed: May 12, 2023

(65) Prior Publication Data

US 2023/0384885 A1 Nov. 30, 2023

(30) Foreign Application Priority Data

May 24, 2022 (KR) .................. 10-2022-0063434

(51) Int. Cl.
*G06F 3/041* (2006.01)
*G06F 3/044* (2006.01)
(52) U.S. Cl.
CPC ........ *G06F 3/04164* (2019.05); *G06F 3/0418* (2013.01); *G06F 3/044* (2013.01); *G06F 3/0412* (2013.01)

(58) Field of Classification Search
CPC .... G06F 3/04164; G06F 3/0418; G06F 3/044; G06F 3/0412
See application file for complete search history.

(56) References Cited

U.S. PATENT DOCUMENTS

2020/0183539 A1\* 6/2020 Kang .................... G06F 3/0418
2021/0200415 A1\* 7/2021 Jun ........................ G06F 3/0418

\* cited by examiner

*Primary Examiner* — Peter D McLoone
(74) *Attorney, Agent, or Firm* — POLSINELLI PC

(57) ABSTRACT

An analog front end for a touch display device operates each of two or more charge removers through a simplified wiring structure by providing an analog front end including a charge remover including a switched-capacitor array that discharges electric charge of a first input terminal of an operational amplifier and a control signal latching circuit that latches a received serial signal according to a generated pulse to generate and output an individual control signal of the switched-capacitor array.

15 Claims, 16 Drawing Sheets

FIG.3
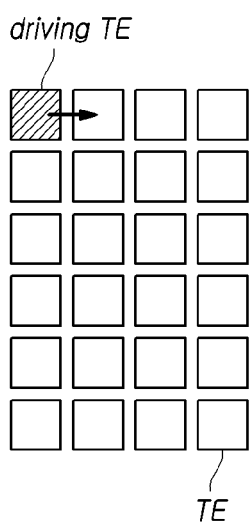
Case A
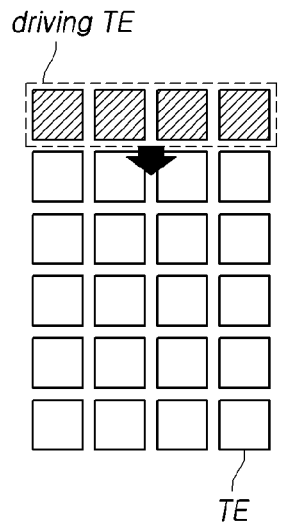
Case B
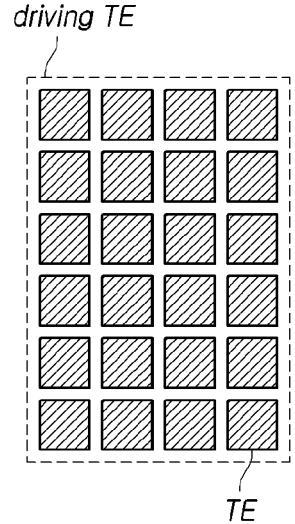
Case C
LFD driving

FIG.14
910
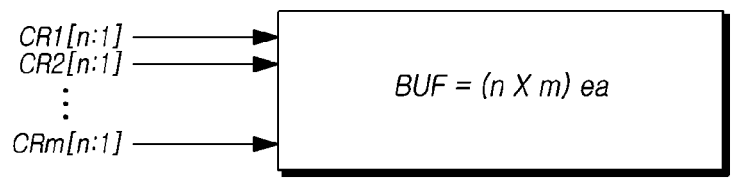

ANALOG FRONT END AND TOUCH DISPLAY DEVICE

CROSS-REFERENCE TO RELATED APPLICATION

This application claims priority from Korean Patent Application No. 10-2022-0063434, filed on May 24, 2022, which is hereby incorporated by reference in its entirety.

BACKGROUND

Field of the Disclosure

The present disclosure relates to an analog front end and a touch display device.

Description of the Background

The growth of intelligence society leads to various needs for displays and wide use of various forms of displays, such as liquid crystal displays (LCDs), plasma display panels (PDPs), or organic light emitting displays (OLEDs).

Among others, touch display devices provide an input scheme that allows users easier and more intuitive and convenient entry of information or commands without the need for buttons, a keyboard, a mouse, or other typical input means.

The touch display device may sense the presence of a touch input by sensing the capacitance that varies due to approach of a pointer, such as a human finger.

The touch display device that senses a change in capacitance to determine the presence of a touch input may include one or more touch electrodes that receive a touch.

To prevent the voltage of a line from continuously increasing due to a signal received from one or more touch electrodes, the touch display device may further include a charge remover that removes charges from the corresponding line.

The touch display device may include two or more charge removers. To operate the two or more charge removers, a line is provided for inputting a signal to control each charge remover.

Therefore, it is required to provide a touch display device capable of individually operating two or more charge removers through a simplified wiring structure.

SUMMARY

Accordingly, the present disclosure is to provide an analog front end and a touch display device capable of individually operating two or more charge removers through a simplified wiring structure.

Various aspects of the present disclosure may provide an analog front end comprising a multiplexer circuit including two or more input ends, to which a voltage is applied from one or more touch electrodes disposed on a touchscreen panel, and at least one output end, an operational amplifier including a first input terminal to which a voltage output from the output end of the multiplexer is applied, a charge remover including a switched-capacitor array electrically connected with the first input terminal of the operational amplifier and discharging electric charge of the first input terminal of the operational amplifier, and a control signal latching circuit receiving a start signal and a synchronization signal to generate a pulse and latching a received serial signal according to the pulse to generate and output an individual control signal of the switched-capacitor array.

Various aspects of the present disclosure may provide a touch display device comprising a touchscreen panel on which a plurality of touch electrodes are disposed, a touch driving circuit sensing the plurality of touch electrodes, and a touch controller controlling a driving timing of the touch driving circuit, wherein the touch driving circuit further includes a multiplexer circuit including two or more input ends, to which a voltage is applied from one or more touch electrodes among the plurality of touch electrodes, and at least one output end, an operational amplifier including a first input terminal to which a voltage output from the output end of the multiplexer is applied, a charge remover including a switched-capacitor array electrically connected with the first input terminal of the operational amplifier and discharging electric charge of the first input terminal of the operational amplifier, and a control signal latching circuit receiving a start signal and a synchronization signal to generate a pulse and latching a received serial signal according to the pulse to generate and output an individual control signal of the switched-capacitor array.

Various aspects of the present disclosure may provide an analog front end comprising a multiplexer including two or more input ends, to which a voltage is applied from one or more touch electrodes disposed on a touchscreen panel, and at least one output end, an operational amplifier including a first input terminal discharging electric charge of the first input terminal of the operational amplifier, a charge remover including a switched-current source array electrically connected with the first input terminal of the operational amplifier and discharging electric charge of the first input terminal of the operational amplifier, and a control signal latching circuit receiving a start signal and a synchronization signal to generate a pulse and latching a received serial signal according to the pulse to generate and output an individual control signal of the switched-current source array.

According to various aspects of the present disclosure, there may be provided an analog front end and a touch display device capable of individually operating two or more charge removers through a simple wiring structure.

It is to be understood that both the foregoing general description and the following detailed description are exemplary and explanatory and are intended to provide further explanation of the disclosure as claimed.

BRIEF DESCRIPTION OF THE DRAWINGS

The above and other features and advantages of the disclosure will be more clearly understood from the following detailed description, taken in conjunction with the accompanying drawings, in which:

FIG. 3 is a view illustrating a touch driving method of a touch display device according to aspects of the present disclosure;

FIG. 14 is a view briefly illustrating an effect of reducing the size of a buffer in a touch display device according to aspects of the present disclosure;

DETAILED DESCRIPTION

Figure 1:
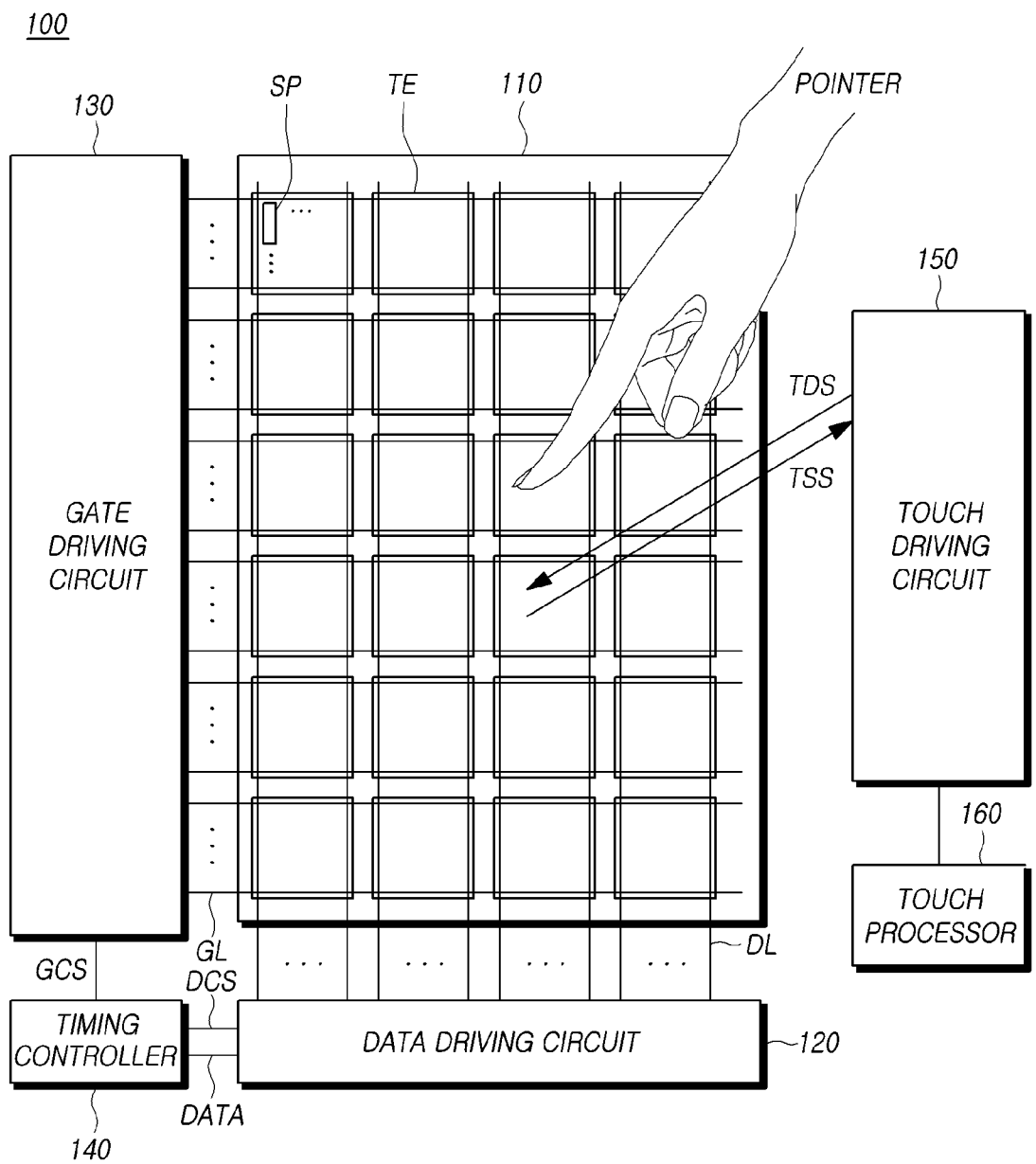
FIG. 1 is a view illustrating a system configuration of a touch display device according to aspects of the present disclosure.

In the following description of examples or aspects of the present disclosure, reference will be made to the accompanying drawings in which it is shown by way of illustration specific examples or aspects that may be implemented, and in which the same reference numerals and signs may be used to designate the same or like components even when they are shown in different accompanying drawings from one another. Further, in the following description of examples or aspects of the disclosure, detailed descriptions of well-known functions and components incorporated herein will be omitted when it is determined that the description may make the subject matter in some aspects of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "A", or "B" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only may the first element "be directly connected or coupled to" or "directly contact or overlap" the second element, but a third element may also be "interposed" between the first and second elements, or the first and second elements may "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e. g., level, range, etc.) include a tolerance or error range that may be caused by various factors e.g., process factors, internal or external impact, noise, etc.) even when a relevant description is not specified. Further, the term "may" fully encompasses all the meanings of the term "may".

Hereinafter, various aspects of the disclosure are described in detail with reference to the accompanying drawings.

FIG. 1 is a view illustrating a system configuration of a touch display device 100 according to aspects of the disclosure.

Referring to FIG. 1, a touch display device 100 according to aspects of the present disclosure may include a display panel 110 and various circuits.

The touch display device 100 according to aspects of the disclosure may perform a display function for displaying an image and a touch function for detecting a touch by a pointer, such as a finger or a pen.

The touch display device 100 according to aspects of the disclosure may include a touchscreen panel TSP to perform the touch function.

The touchscreen panel TSP may be present outside the display panel 110, and in this case, the touchscreen panel TSP is of an add-on attached to the display panel 110.

Further, the touchscreen panel TSP may be of a built-in type in which it is present inside the display panel 110 and, in this case, the touchscreen panel TSP may be embedded in an in-cell type or an on-cell type, in the display panel 110.

Hereinafter, for convenience of description, it is assumed in the following description that the touchscreen panel TSP is of a built-in type in which it is embedded in the display panel 110. Thus, the term "display panel 110" may be used below instead of the touchscreen panel TSP, and the display panel 110 described below may also mean the touchscreen panel TSP.

Meanwhile, the touch display device 100 according to aspects of the disclosure may perform the display function and the touch function in different periods of time.

In other words, in the touch display device 100 according to aspects of the disclosure, a display period for performing the display function and a touch sensing period for performing the touch function may be temporarily separated from each other.

In this case, the touch display device 100 according to aspects of the disclosure may be said to time-divisionally perform display driving for image display and touch sensing driving for touch sensing.

A plurality of data lines DL for transferring data signals and a plurality of gate lines GL for transferring gate signals may be disposed on the display panel 110 according to aspects of the disclosure. A plurality of subpixels SP that receive the above-described signals from a plurality of data lines DL and a plurality of gate lines GL may be disposed on the display panel 110. An area where a plurality of subpixels SP are disposed and an image is displayed in the display panel 110 may be defined as an active area. An area where no image is displayed around the display area in the display panel 110 may be defined as a non-active area.

Further, since the display panel 110 according to aspects of the disclosure may simultaneously function as a touchscreen panel TSP, a plurality of touch electrodes TE serving as a touch sensor may be embedded therein. The plurality of touch electrodes TE may be disposed to overlap with the subpixels SP in the display area.

In this sense, the display panel 110 according to aspects of the disclosure is said to embed a touchscreen panel TSP, and this type of display panel 110 is also referred to as a "touchscreen-embedded display panel".

Referring to FIG. 1, the touch display device 100 according to aspects of the disclosure may include a data driving circuit 120 for outputting data signals to drive a plurality of data lines DL, and a gate driving circuit 130 for outputting gate signals to drive a plurality of gate lines GL.

The touch display device 100 according to aspects of the disclosure may further include a timing controller 140 for controlling operation timing or power supply of the data driving circuit 120 and the gate driving circuit 130.

The timing controller 140 may supply a data driving circuit control signal DCS for controlling the operation timing of the data driving circuit 120 and image data DATA to the data driving circuit 120.

Referring to FIG. 1, the touch display device 100 according to aspects of the disclosure may include a touch driving circuit 150 for driving a plurality of touch electrodes TE to perform a touch function and a touch controller 160 for determining the present of a touch and/or a touch position based on the signal received from the driven touch electrode TE.

The touch driving circuit 150 may supply a touch driving signal TDS to the plurality of touch electrodes TE to drive the plurality of touch electrodes TE.

Further, the touch driving circuit 150 may sense one or more touch electrodes TE among a plurality of touch electrodes TE disposed on the display panel 110 to receive a touch sensing signal (TSS).

For example, the touch driving circuit 150 may receive a touch sensing signal TSS by sensing the touch electrode TE to which the touch driving signal TDS is applied to the display panel 110. For example, the touch driving circuit 150 may receive the touch sensing signal TSS by sensing the touch electrode TE positioned around the touch electrode TE to which the touch driving signal TDS is applied.

The touch driving circuit 150 transfers the received touch sensing signal TSS or detection data obtained by signal processing the received touch sensing signal to the touch controller 160.

The touch controller 160 may execute a touch algorithm (touch sensing process) based on the touch sensing signal TSS or sensing data, and determine the presence of a touch and/or the touch position.

The touch display device 100 according to aspects of the disclosure may employ a self-capacitance-based touch sensing method for identifying whether a touch exists and/or a touch position by identifying a change in capacitance between each touch electrode TE to which the touch driving signal TDS is applied and the pointer.

Accordingly, the touch driving signal TDS is applied to each touch electrode TE, and the touch sensing signal TSS is detected from each touch electrode TE to which the touch driving signal TDS is applied.

Meanwhile, in the touch display apparatus 100 according to aspects of the disclosure, the plurality of touch electrodes TE may include a touch driving electrode (also referred to as a TX electrode) and a touch sensing electrode (also referred to as an RX electrode). The touch driving signal TDS is applied to the touch driving electrode, and the touch sensing signal TSS is received from the touch sensing electrode.

Accordingly, the touch display device 100 according to aspects of the disclosure may determine the presence of a touch and/or a touch position through a change in capacitance between the touch driving electrode and the touch sensing electrode. The touch sensing method that detects the presence of a touch and/or a touch position through a change in capacitance between the touch driving electrode and the touch sensing electrode is also referred to as a mutual-capacitance touch sensing method. The touch display device 100 according to aspects of the disclosure may adopt a mutual-capacitance touch sensing method.

However, for convenience of description, it is assumed that a self-capacitance touch sensing method is employed. However, the disclosure is not limited thereto.

Meanwhile, the data driving circuit 120, the gate driving circuit 130, the timing controller 140, the touch driving circuit 150, and the touch controller 160 described above are functionally classified so. The above-described components may be separately implemented and, in some cases, two or more components may be implemented to be integrated.

The size of one touch electrode TE may be greater than the size of one subpixel SP. The size of one touch electrode TE may correspond to or be greater than the size of the area occupied by a plurality of subpixels SP.

The ratio between the size of the touch electrode TE and the size of the subpixel SP may be designed to vary comprehensively considering touch sensing efficiency, touch sensing performance, or influence of the display function by touch sensing.

In some cases, one touch electrode TE may be configured as one bulk electrode.

In some cases, one touch electrode TE may be a plate electrode without an opening, or an electrode having one or more openings.

In some cases, one touch electrode TE may be configured such that a plurality of sub electrodes are arranged in a mesh form and electrically connected to each other.

In some cases, in one touch electrode TE, a plurality of sub electrodes may be arranged in a line shape and electrically connected to form one touch electrode.

As such, the touch electrode TE may be designed in various shapes and sizes. Accordingly, one touch electrode TE illustrated in FIG. 1 may be a single touch driving unit area and/or a touch sensing unit area.

Meanwhile, the touch display device 100 according to aspects of the disclosure may be various types of display devices such as a liquid crystal display device or a self-emissive display device, from a display function perspective.

For example, the touch display device 100 according to aspects of the disclosure may be a liquid crystal display device. When the touch display device 100 according to aspects of the disclosure operates according to a time division driving method, the plurality of touch electrodes TE may perform different functions during a display period and a touch sensing period.

For example, the touch display device 100 according to aspects of the disclosure may be a self-emissive display device. In this case, the display panel 110 may be self-emissive. Each of the plurality of subpixels SP may include a light emitting element.

The touch display device 100 according to aspects of the disclosure may be an organic light emitting diode display in which the light emitting element is implemented as an organic light emitting diode (OLED). The touch display device 100 according to aspects of the disclosure may be a light emitting display device in which the light emitting element is implemented as an inorganic material-based light emitting diode. The touch display device 100 according to aspects of the disclosure may be a quantum dot display device in which the light emitting element includes a quantum dot which is self-emission semiconductor crystal.

In the touch display device 100 according to aspects of the disclosure, the plurality of touch electrodes TE may function as a common electrode to which a voltage is commonly applied in terms of the display function during the display period. During the touch period, the plurality of touch electrodes TE may function as touch electrodes providing the touch sensing function in terms of the touch function.

The common electrode may be an electrode forming a capacitor between it and the pixel electrode to which the data voltage is applied in the liquid crystal display device.

The common electrode may be an electrode that supplies a base voltage to the light emitting element. As an example, this common electrode may be a cathode electrode (or anode electrode) of the light emitting element.

Figure 2:
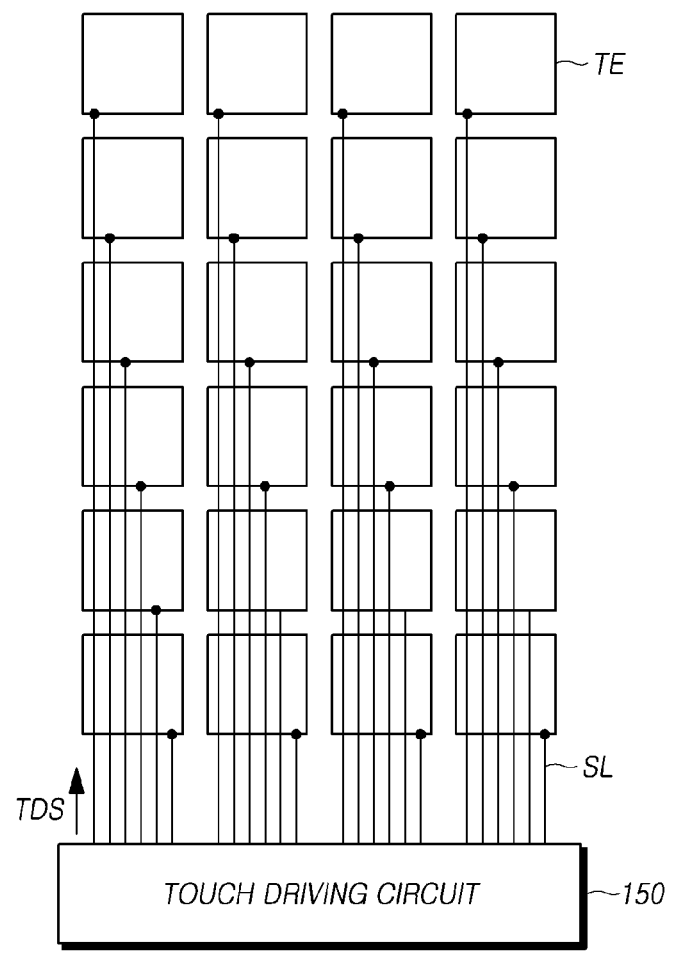
FIG. 2 is a view exemplarily illustrating a touchscreen panel embedded in a display panel of a touch display device according to aspects of the disclosure and a touch driving circuit for driving the touchscreen panel.

FIG. 2 is a view illustrating an example of a touch sensing period TSP embedded in a display panel 110 of a touch display device 100 and a touch driving circuit 150 for driving the touch sensing period TSP according to aspects of the present disclosure.

FIG. 2 illustrates an example structure of a self-capacitance touchscreen panel TSP.

Referring to FIG. 2, a plurality of touch electrodes TE and signal lines SL may be disposed on the touchscreen panel TSP. The signal lines SL may perform a function of electrically connecting the plurality of touch electrodes TE and the touch driving circuit 150.

In the self-capacitance touch sensing structure, the plurality of touch electrodes TE may be disposed without overlapping with each other. A plurality of touch electrodes TE and a plurality of signal lines SL may be disposed on the same layer or different layers.

When the plurality of touch electrodes TE and the plurality of signal lines SL are positioned on the same layer, the plurality of signal lines SL may be disposed not to overlap with the plurality of touch electrodes TE.

When the plurality of touch electrodes TE and the plurality of signal lines SL are positioned on different layers, the plurality of signal lines SL may be disposed to overlap with the plurality of touch electrodes TE.

The plurality of signal lines SL may be disposed without overlapping with each other, but are not limited thereto.

The touch driving circuit 150 may output the touch driving signal TDS to one or more touch electrodes among the plurality of touch electrodes TE during the touch sensing period.

One or more signal lines SL among the plurality of signal lines SL may transfer the touch driving signal TDS to the touch electrode TE during the touch sensing period. One or more of the plurality of signal lines SL may transfer a common voltage to the touch electrode TE during the display period.

FIG. 3 is a view illustrating a touch driving method of a touch display device 100 according to aspects of the disclosure.

Although an example in which 24 touch electrodes TE are arranged in six rows and four columns is described with reference to FIG. 3, the disclosure is not limited thereto.

Referring to FIG. 3, the touch driving circuit 150 according to aspects of the disclosure may drive only one touch electrode TE at any one time, as in case A, or may drive a plurality of touch electrodes TE as in case B.

In case A, the touch display device 100 according to aspects of the disclosure may include a multiplexer (not shown) that selects one of 24 touch electrodes TE. The multiplexer may correspond to one analog front end (AFE).

In case B, a touch display device according to aspects of the disclosure may configure one sensing unit by configuring two or more touch electrodes TE as one group.

Referring to FIG. 3, one sensing unit may be formed by grouping two or more touch electrodes TE among 24 touch electrodes TE.

For example, one sensing unit may be formed by grouping four touch electrodes TE positioned in the same row. Two or more touch electrodes TE constituting one sensing unit may be simultaneously sensed. Depending on the point of view, two or more touch electrodes TE constituting one sensing unit may be simultaneously driven.

The touch driving circuit 150 may sense two or more touch electrodes TE constituting one sensing unit and receive a touch sensing signal TSS.

The two or more touch electrodes TE constituting one sensing unit may receive a touch driving signal TDS from one analog front end AFE. Further, the two or more touch electrodes TE constituting one sensing unit may output the touch sensing signal TSS to one analog front end.

Meanwhile, the touch display device according to aspects of the disclosure may output a signal that is the same as or similar to the touch driving signal TDS to the surrounding patterns to reduce the influence of unnecessary parasitic capacitance formed between the touch electrode TE to which the touch driving signal TDS is applied and the surrounding patterns (e. g., a data line, a gate line, or other touch electrodes).

A driving method for applying a signal identical to or similar to the touch driving signal TDS to surrounding patterns is also referred to as load free driving (LFD).

For example, the same signal as the touch driving signal TDS may be applied to one or more touch electrodes TE positioned around the touch electrode TE for touch sensing through load-free driving.

Case C is a method for sensing a touch by driving one or more touch electrodes TE that do not sense a touch. Referring to this, the touch display device according to aspects of the disclosure may apply the touch driving signal TDS to one or more touch electrodes TE positioned around the touch electrode TE for touch sensing.

Figure 4:
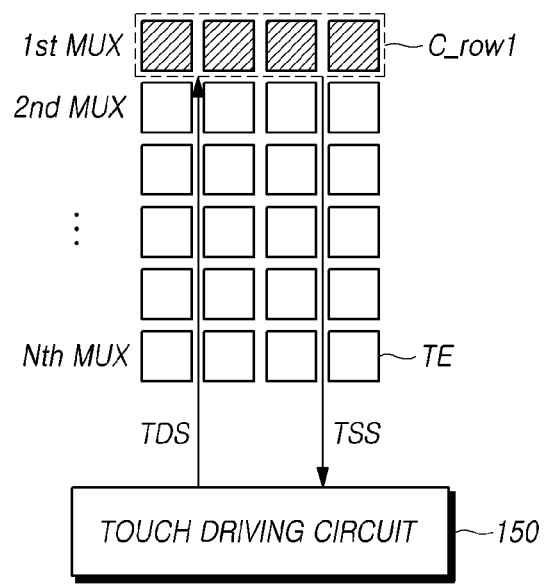
FIG. 4 is a view exemplarily illustrating a sensing timing when a touch display device according to aspects of the present disclosure collectively senses two or more touch electrodes.

FIG. 4 is a view exemplarily illustrating a sensing timing when a touch display device according to aspects of the present disclosure collectively senses two or more touch electrodes.

Referring to FIG. 4, the touch driving circuit 150 according to aspects may sense four touch electrodes TE as one sensing unit. In this case, the touch driving circuit 150 may include an analog front end that collectively senses the four touch electrodes TE.

The touch driving circuit 150 may divide the plurality of touch electrodes TE into several groups and sense each group as one sensing unit. The touch driving circuit 150 may receive the touch sensing signal TSS by sensing the touch electrodes TE included in one sensing unit during the touch sensing period.

Referring to FIG. 4, four touch electrodes TE included in one sensing unit may be positioned in the same row, for example. In the following description, it is assumed that four touch electrodes positioned in the same row constitute one sensing unit for convenience of description, but the disclosure is not limited thereto.

Each group may be sequentially sensed according to the position on the touchscreen panel or may also be sensed non-sequentially.

For example, four touch electrodes TE positioned in a first row may be sensed in a first sensing period 1st MUX, and four touch electrodes TE positioned in an Nth row may be sensed in an Nth (N≥1) sensing period.

Meanwhile, the order in which the groups are sensed may vary depending on design. Although an example is described below in which the groups are sequentially sensed depending on the position on the touchscreen panel, the disclosure is not limited thereto.

For example, in the first sensing period 1st MUX of the touch driving circuit 150, the four touch electrodes TE positioned in the first row may be simultaneously sensed. When each group is sequentially sensed, the four touch electrodes TE positioned in the first row may function as a first row capacitor C_row1. The four touch electrodes TE apply a touch sensing signal TSS to the touch driving circuit 150.

For example, in the Nth (N≥1) sensing period Nth MUX, four touch electrodes TE positioned in the Nth row may be simultaneously sensed. The touch driving circuit 150 senses the four touch electrodes TE positioned in the Nth row, and the four touch electrodes TE positioned in the Nth row function as the Nth row capacitor C_rowN, applying a touch sensing signal TSS to the touch driving circuit 150.

As described above, the touch display device according to aspects may simultaneously sense two or more touch electrodes TE.

Figure 5:
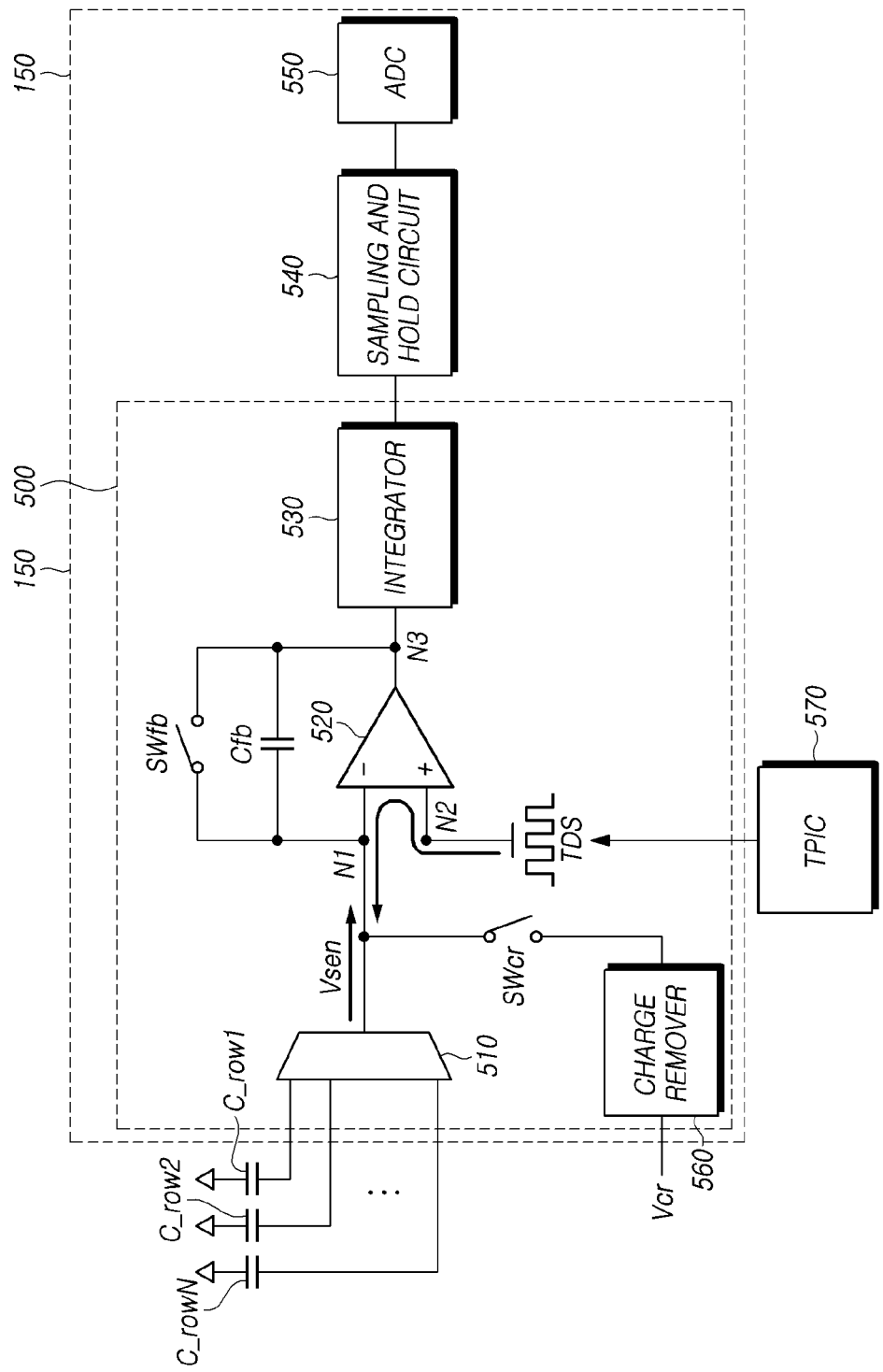
FIG. 5 is a system block diagram illustrating a touch driving circuit included in a touch display device according to aspects of the present disclosure.

FIG. 5 is a system block diagram illustrating a touch driving circuit 150 included in a touch display device according to aspects of the present disclosure.

Referring to FIG. 5, a touch display device according to aspects of the disclosure may include a multiplexer circuit 510, an operational amplifier 520, an integrator 530, a sampling and hold circuit 540, an analog-to-digital converter 550, and a charge remover 560.

The multiplexer circuit 510 may include m input ends and one output end. The multiplexer circuit 510 may output the touch driving signal TDS input to the output end to one or more row capacitors C_row. The multiplexer circuit 510 may receive the touch sensing signal TSS from the row capacitor C_row and output it to the output end. Below, the touch sensing signal TSS output from the multiplexer circuit 510 is referred to as a sensing signal Vsen.

The multiplexer circuit 510 may output each of the touch sensing signals TSS input from the first row capacitor C_row1 to the mth row capacitor C_row(m) as the sensing signal Vsen.

The operational amplifier 520 may include a first input terminal N1, a second input terminal N2, and an output terminal N3.

In the disclosure, terminal collectively refers to any component for connecting an electrode to an input or output portion of current. For example, the terminal may be implemented as, e.g., a pin.

The sensing signal Vsen is input to the first input terminal N1 of the operational amplifier 520. A reference signal is input to the second input terminal N2 of the operational amplifier 520. The reference signal may be, e.g., the above-described touch driving signal TDS. A signal corresponding to a change in capacitance between the touch input object (e.g., a finger, a pen, etc.) and the touch electrode TE may be output to the output terminal N3 of the operational amplifier 520.

The first input terminal N1 of the operational amplifier 520 may be an inverting input terminal (−). The second input terminal N2 of the operational amplifier 520 may be a non-inverting terminal end (+).

Referring to FIG. 5, the touch driving circuit 150 may include a feedback capacitor Cfb electrically connected to the first input terminal N1 and the output terminal N3 of the operational amplifier 520.

The feedback capacitor Cfb includes one end electrically connected to the first input terminal N1 of the operational amplifier 520 and the other terminal electrically connected to the output terminal N3 of the operational amplifier 520.

The feedback capacitor Cfb may be charged with a value corresponding to a voltage difference between the sensing signal Vsen input to the first input terminal N1 of the operational amplifier 520 and the touch driving signal TDS.

Referring to FIG. 5, the touch driving circuit 150 according to aspects of the disclosure may include a feedback switch SWfb that switches an electrical connection between the first input terminal N1 and the output terminal N3 of the operational amplifier 520. Charging and discharging of the feedback capacitor Cfb may be controlled according to the operation of the feedback switch SWfb.

Meanwhile, the touch driving signal TDS input to the second input terminal N2 of the operational amplifier 520 may be input to one or more touch electrodes through the multiplexer circuit 510. Accordingly, the touch driving signal TDS may be input to one or more touch electrodes constituting the sensing unit.

The integrator 530 receives the signal output from the output terminal N3 of the operational amplifier 520.

The integrator 530 integrates the voltage output from the output terminal N3 of the operational amplifier 520 by a predetermined number of times of integration and outputs an integral value.

The sampling and hold circuit 540 samples and stores the integral value output from the integrator 530.

The analog-to-digital converter 550 reads the integral value stored in the sampling and hold circuit 540 and outputs a digital value corresponding to the read integral value. The output digital value is input to the above-described touch controller.

The charge remover 560 removes the charge remaining on the first input terminal N1 of the operational amplifier 520. The charge remover 560 removes the offset voltage formed at the first input terminal N1 of the operational amplifier 520 and prevents the voltage of the first input terminal N1 of the operational amplifier 520 from being saturated.

The charge remover switching element SWcr may switch an electrical connection between the charge remover 560 and the first input terminal N1 of the operational amplifier 520.

A pulse voltage Vcr for charge removal may be input to the charge remover 560.

The touch driving signal TDS input to the second input terminal N2 of the operational amplifier 520 may be generated and output from a touch power integrated circuit (TPIC) 570.

Referring to FIG. 5, the touch driving circuit 150 may include one or more analog front ends 500. The analog front end 500 may be configured as an integrated circuit.

The analog front end 500 may include a multiplexer circuit 510, an operational amplifier 520, an integrator 530, and a charge remover 560, as described above.

The touch driving circuit 150 according to aspects of the disclosure may apply the touch driving signal TDS to one or more touch electrodes. The touch driving circuit 150 according to aspects of the disclosure may sense one or more touch electrodes based on a change in capacitance.

Figure 6:
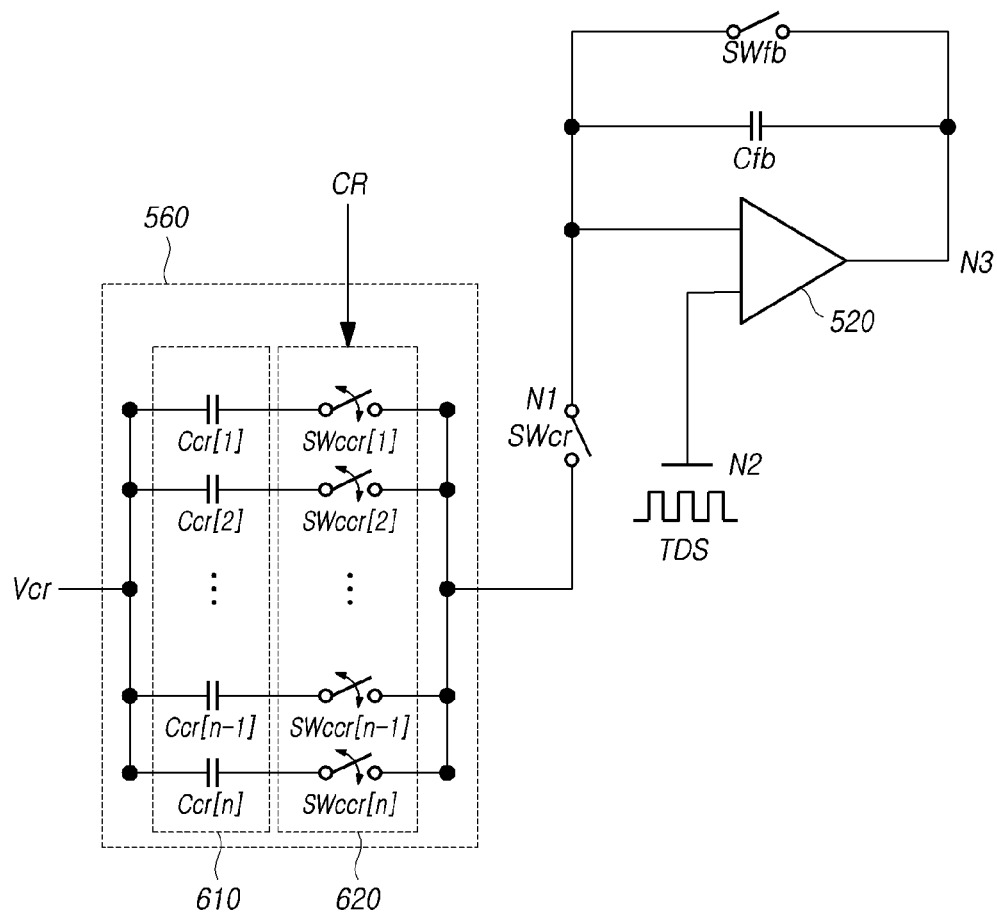
FIG. 6 is a view illustrating, in greater detail, a configuration of a charge remover according to aspects of the present disclosure.

FIG. 6 is a view illustrating, in greater detail, a configuration of a charge remover 560 according to aspects of the present disclosure.

Referring to FIG. 6, the charge remover 560 according to aspects of the disclosure may be configured as a switched-capacitor array.

The switched-capacitor array may include two or more capacitor elements. One electrode of each of the two or more capacitor elements constituting the switched-capacitor array is electrically connected to a corresponding switching element.

For example, one electrode of the first capacitor element Ccr[1] is electrically connected to the first switching element SWccr[1].

If the first switching element SWccr[1] is turned on, a constant voltage may be applied to two opposite ends of the first capacitor element Ccr[1] to charge the first capacitor element. The charge of the first input terminal N1 of the operational amplifier 520 may be input to the first capacitor element Ccr[1], so that the first capacitor element Ccr[1] may be charged.

When the first switching element SWccr[1] is turned off, the charged first capacitor element Ccr[1] may be discharged.

Referring to FIG. 6, the switched-capacitor array may include n (n≥2) capacitor elements. Charging and discharging of the nth capacitor element Ccr[n] may be controlled by the nth switching element SWccr[n].

The switched-capacitor array may include a capacitor array 610 including two or more capacitor elements and a switching element array 620 including two or more switching elements.

The operation timing of the switching element array 620 may be controlled by a parallel signal (PS).

A touch display device according to aspects of the disclosure may include two or more charge removers 560. The parallel signal PS may be input to each of the two or more charge removers 560 through a different line.

Since one switching element has a state of on or off, the parallel signal PS for controlling the switching element array 620 including n switching elements may be a signal of n bits. Further, the parallel signal PS may further include a signal indicating the start of sensing or the end of sensing. In this case, the size of the parallel signal PS may be larger than n bits.

As described above, the operation of the charge remover 560 may be controlled by inputting the parallel signal PS having an n-bit size to the switching element array 620.

Figure 7:
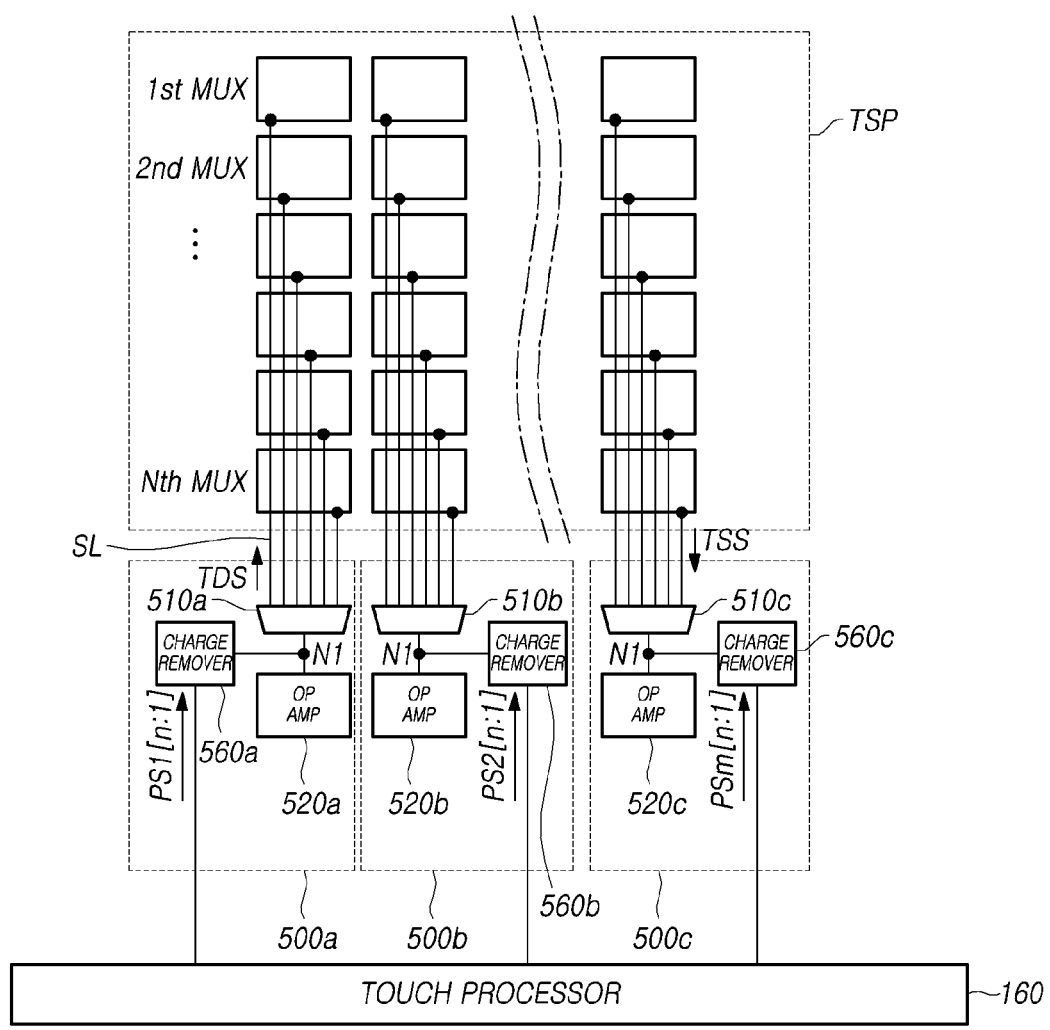
FIG. 7 is a view illustrating a plurality of charge removers and a touch controller controlling the plurality of charge removers.

FIG. 7 is a view illustrating a plurality of charge removers 560*a*, 560*b*, and 560*c* and a touch controller 160 controlling the plurality of charge removers 560*a*, 560*b*, and 560*c*.

Referring to FIG. 7, a touch display device according to aspects of the disclosure may include a plurality of analog front ends 500*a*, 500*b*, and 500*c*.

The plurality of analog front ends 500*a*, 500*b*, and 500*c*, respectively, may include multiplexer circuits 510*a*, 510*b*, and 510*c*, operational amplifiers 520*a*, 520*b*, and 520*c*, and charge removers 560*a*, 560*b*, and 560*c*.

For example, the first analog front end 500*a* may include a first multiplexer circuit 510*a*, a first operational amplifier 520*a*, and a first charge remover 560*a*. The second analog front end 500*b* may include a second multiplexer circuit 510*b*, a second operational amplifier 520*b*, and a second charge remover 560*b*. The mth analog front end 500*c* may include an mth multiplexer circuit 510*c*, an mth operational amplifier 520*c*, and an mth charge remover 560*c*.

Referring to FIG. 7, the touch display device according to aspects of the disclosure may include a touch controller 160, and the touch controller 160 may output m parallel signals PS through m lines, respectively. The m lines may be electrically connected to the analog front ends 500*a*, 500*b*, and 500*c*, respectively.

Meanwhile, although it is described in connection with FIG. 7 that the size of the parallel signal PS is n bits, the disclosure is not limited thereto.

Referring to FIG. 7, the touch controller 160 may output n-bit parallel signals (e.g., PS1[n:1], PS2[n:1], PSm[n:1]) for controlling the plurality of charge removing circuits 560*a*, 560*b*, and 560*c*, respectively.

For example, the touch controller 160 may output an n-bit first parallel signal PS1[n:1] for controlling a first charge remover 560*a*. The touch controller 160 may output an n-bit second parallel signal PS2[n:1] for controlling a second charge remover 560*b*. The touch controller 160 may output an n-bit mth parallel signal PSm[n:1] for controlling an mth charge remover 560*c*.

Referring to FIG. 7, the plurality of parallel signals PS1, PS2, and PSm for controlling the plurality of charge removers 560*a*, 560*b*, and 560*c*, respectively, are output from the touch controller 160.

In this case, lines for applying a plurality of control signals CR1, CR2, and CRm should be separately configured, so that the line configuration between the touch controller 160 and the plurality of analog front ends 500*a*, 500*b*, and 500*c* may be complicated.

Accordingly, a need exists for providing a touch display device capable of driving a plurality of charge removers 560*a*, 560*b*, and 560*c* while simplifying the line configuration between the touch controller 160 and the plurality of analog front ends 500*a*, 500*b*, and 500*c*.

Figure 8:
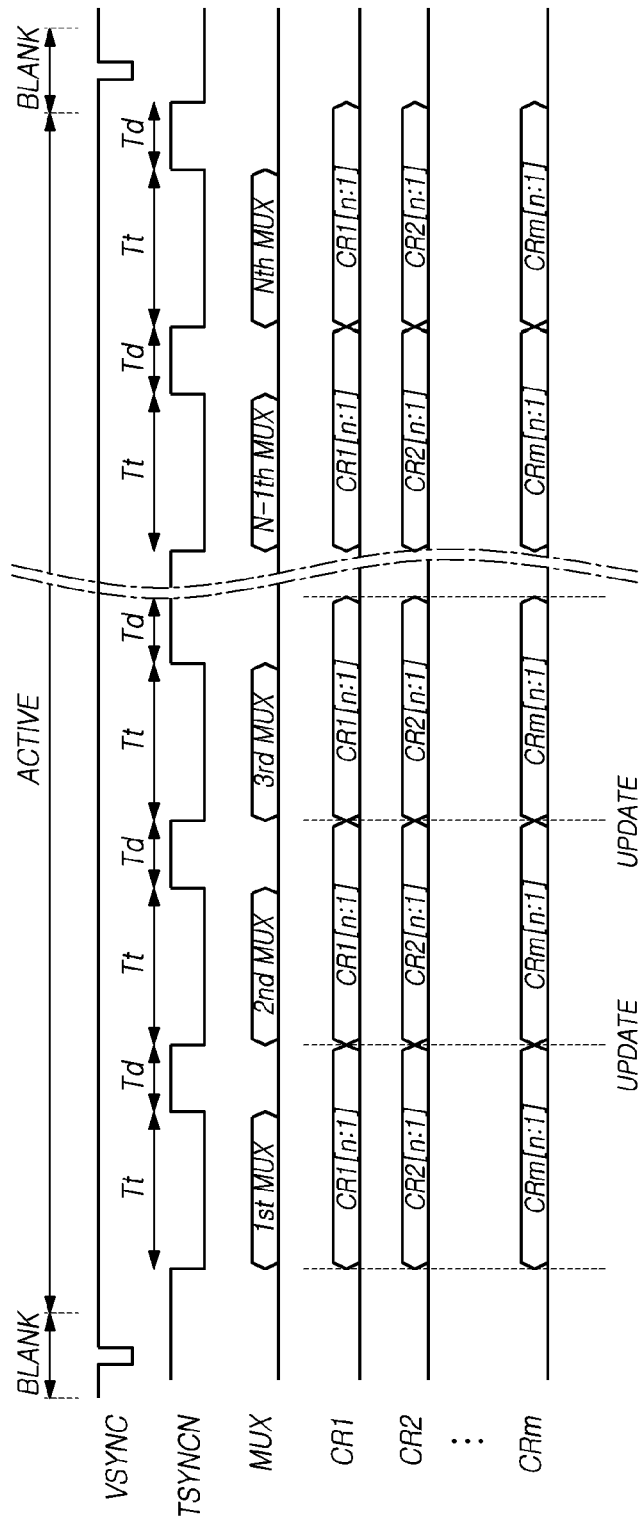
FIG. 8 is a view illustrating an operation timing of a charge remover in a touch display device according to aspects of the present disclosure.

FIG. 8 is a view illustrating an operation timing of a charge remover in a touch display device according to aspects of the present disclosure.

Referring to FIG. 8, one frame is defined with respect to the vertical synchronization signal VSYNC. One frame includes an active period ACTIVE and a blank period BLANK. Image data of the image displayed in one frame is output to data lines disposed on the display panel during the active period ACTIVE.

Meanwhile, the touch display device according to aspects of the disclosure may perform touch sensing in a time division driving method in which the display period Td in which an image is displayed and the touch sensing period Tt in which touch sensing is performed are temporally separated.

Alternatively, the touch display device according to aspects of the disclosure may perform touch sensing in a simultaneous driving method in which the display period Td in which an image is displayed and the touch sensing period Tt in which touch sensing is performed at least partially overlap.

Although an example is described below in which the touch display device according to aspects of the disclosure performs touch sensing in the time division method for convenience of description, the disclosure is not limited thereto.

When touch sensing is performed in the time division manner, the touch sensing period Tt and the display period Td may be divided by the touch synchronization signal TSYNCN.

For example, a period when the touch synchronization signal TSYNCN has a low level or a high level may be the touch sensing period Tt. Further, a period when the level of the touch synchronization signal TSYNCN has a high level or a low level may be the display period Td.

FIG. 8 illustrates an example in which a period when the level of the touch synchronization signal TSYNCN is a low level is the touch sensing period Tt, and a period when the level of the touch synchronization signal TSYNCN is a high level is the display period Td.

When the touch display device according to aspects of the disclosure performs touch sensing in the time division driving method, one frame period defined by the vertical synchronization signal VSYNC may include at least one touch sensing period Tt and at least one display period Td.

In terms of the touch synchronization signal TSYNCN, during one frame period, the touch synchronization signal TSYNCN may include at least one touch sensing period Tt and at least one display period Td.

In some cases, during one frame period, the touch synchronization signal TSYNCN may include two or more touch sensing periods Tt or two or more display periods Td.

Referring to FIG. 8, an aspect in which the touch synchronization signal TSYNCN has N touch sensing periods Tt and N display periods Td during one frame period is shown as an example.

Meanwhile, referring to FIG. 8, an aspect in which one touch sensing period Tt includes one sensing period (e.g., the first sensing period 1st MUX, the second sensing period 2nd MUX, or the Nth sensing period Nth MUX is illustrated.

In other words, the touch display device according to aspects of the disclosure may sense one sensing unit in one touch sensing period Tt.

In contrast, in the touch display device according to aspects of the disclosure, one touch sensing period Tt may include two or more sensing periods (e.g., the first sensing period 1st MUX and the second sensing period 2nd MUX).

In other words, the touch display device according to aspects of the disclosure may sense two or more sensing units in one touch sensing period Tt.

However, in the following description, for convenience of description, it is assumed that the touch display device according to aspects of the disclosure senses one sensing unit in one touch sensing period Tt, but the disclosure is adapted thereto.

Referring to FIG. 8, in the touch display device according to aspects of the present disclosure, a plurality of control signals CR1, CR2, . . . , CRm are input in each sensing period (e.g., the first sensing period 1st MUX, the second sensing period 2nd MUX, . . . , the Nth sensing period Nth MUX).

As is described below, the plurality of control signals CR1, CR2, . . . , CRm are distinguished from the above-described parallel signal PS in that they are output from the timing controller through one line.

For example, in the first sensing period 1st MUX, the first control signal CR1 to the mth control signal CRm are all input to one line. Further, all of the first control signal CR1 to the mth control signal CRm are input to one line in the second sensing period 2nd MUX.

Further, data of the plurality of control signals CR1, CR2, . . . , CRm may be updated every sensing period.

For example, the first control signal CR1 is updated at any point between the first sensing period 1st MUX and the second sensing period 2nd MUX.

Referring to FIG. 8, in the touch display device according to the aspects of the disclosure, the times when the plurality of control signals CR1, CR2, . . . , CRm are updated may be the same or different.

Figure 13:
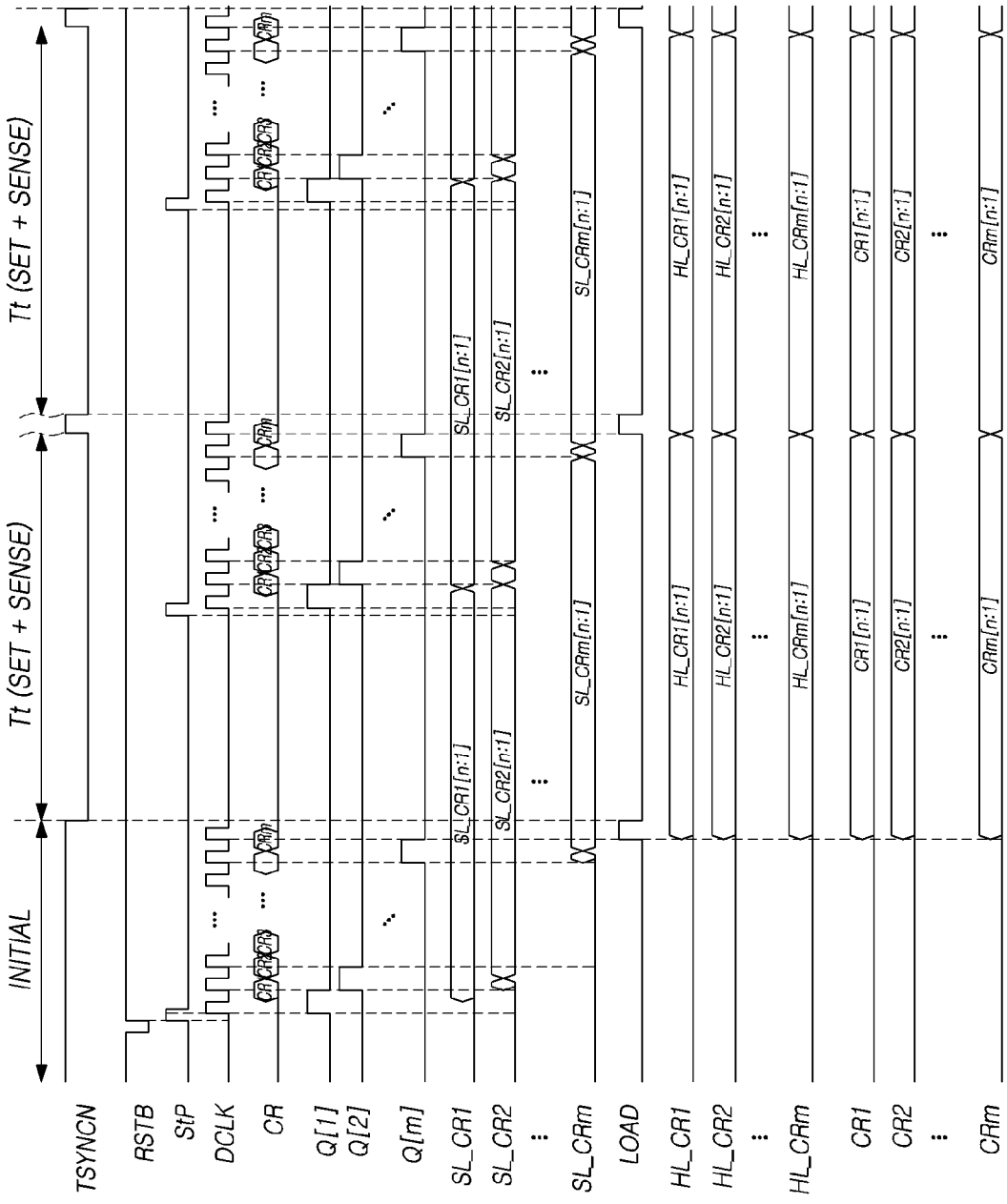
FIG. 13 is a timing diagram illustrating signals input to the SCRD circuits of FIG. 12 and signals output from the SCRD circuits.

As is described below, FIGS. 8 and 13 illustrate an aspect in which the times when the plurality of control signals CR1, CR2, . . . , CRm are updated are the same.

Figure 11:
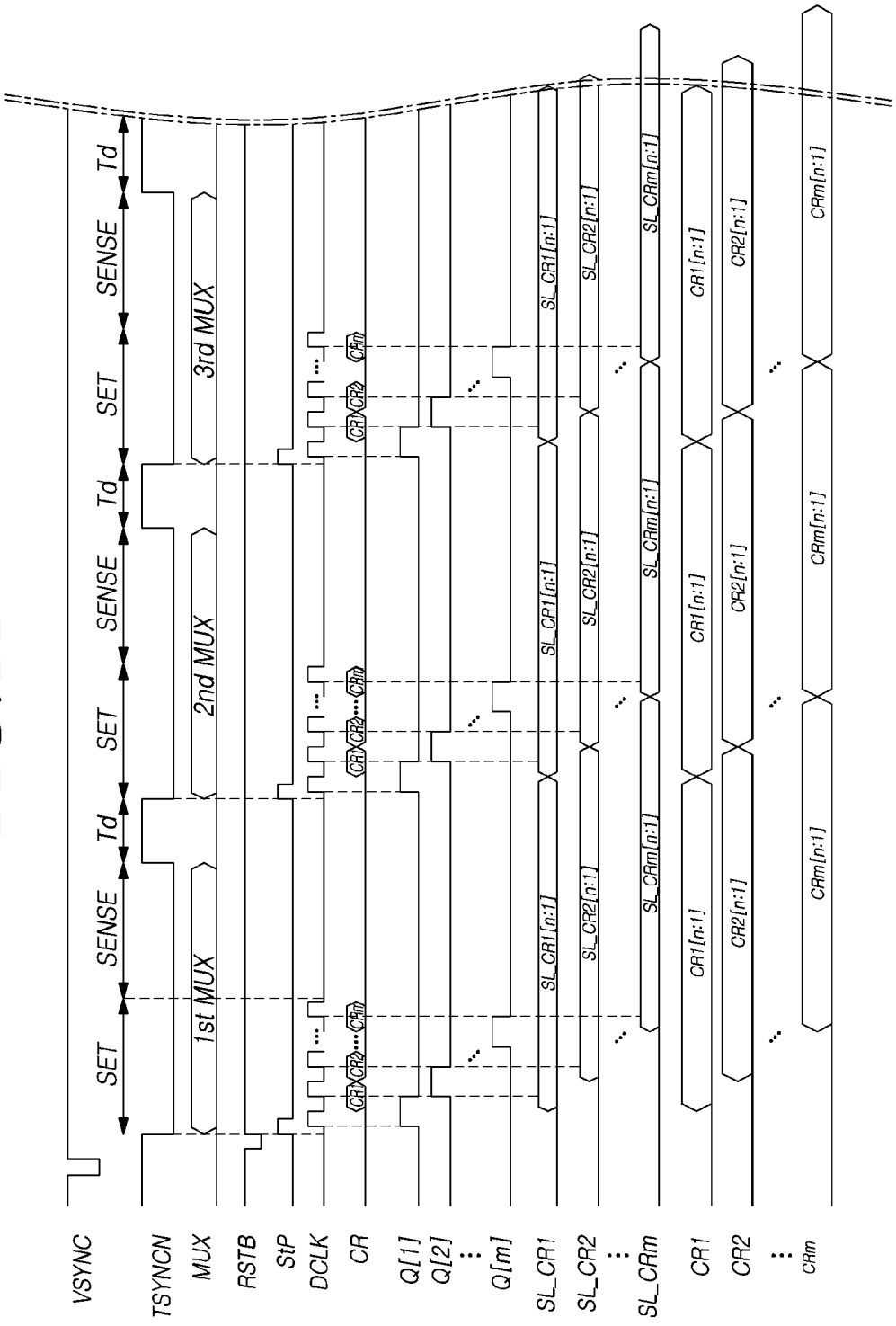
FIG. 11 is a timing diagram illustrating signals input to the SCRD circuits of FIG. 10 and signals output from the SCRD circuits.

As is described below, FIG. 11 illustrates an aspect in which the times when the plurality of control signals CR1, CR2, . . . , CRm are updated are different from each other within one sensing period.

When the update times are the same, the plurality of control signals CR1, CR2, . . . , CRm may be updated when the touch sensing period Tt starts. Further, in some cases, the plurality of control signals CR1, CR2, . . . , CRm may be updated during the touch sensing period Tt. Further, in some cases, the plurality of control signals CR1, CR2, . . . , CRm may be updated during the display period Td.

When update times are different, the plurality of control signals CR1, CR2, . . . , CRm may be updated during the touch sensing period Tt. Further, in some cases, the plurality of control signals CR1, CR2, . . . , CRm may be updated during the display period Td.

A touch display device according to aspects of the disclosure may simplify the configuration of the line through which the control signal for controlling a charge remover is output while updating a plurality of control signals CR1, CR2, . . . , CRm every sensing period.

A configuration of an analog front end for providing the above-described touch display device is described below in greater detail.

Figure 9:
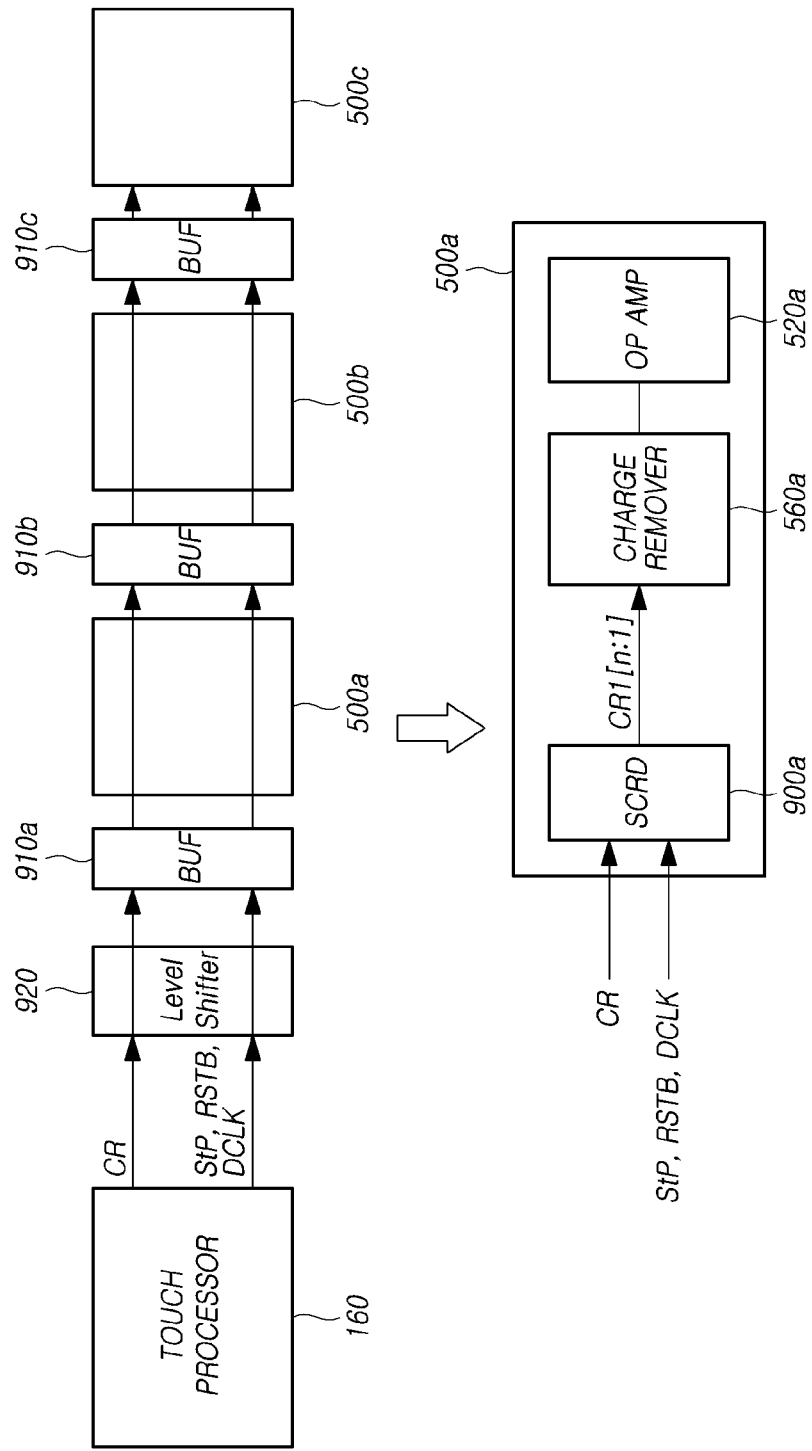
FIG. 9 is a view illustrating an analog front end that receives serial charge removal signals and outputs an individual control signal of a charge remover in a touch display device according to aspects of the present disclosure.

FIG. 9 is a view illustrating an analog front end 500*a*, 500*b*, or 500*c* that receives serial charge removal signals CR and outputs an individual control signal of a charge remover 560 in a touch display device according to aspects of the disclosure.

Here, the serial charge removal signal CR is distinguished from the above-described parallel signal PS in that it is output from the timing controller 160 through one line.

Referring to FIG. 9, a touch display device according to aspects of the disclosure includes two or more analog front ends 500*a*, 500*b*, and 500*c* including a touch controller 160 outputting a serial charge removal signal CR and a charge remover 560.

The touch display device according to aspects of the disclosure may further include a level shifter (L/S) 920 that changes the voltage level of the signal output from the touch controller 160 and outputs the signal to the analog front ends 500a, 500b, and 500c.

Meanwhile, signals (such as the charge removal signal CR) output from the touch controller 160 may be supplied to the plurality of analog front ends 500a, 500b, and 500c through a line which may act as a load. As a result, the signals output from the touch controller 160 may be subject to toggle timing delay or reduction in signal level.

Accordingly, the touch display device according to aspects of the disclosure may include one or more buffers (BUF) 910 configured to maintain the toggle timings and signal levels of signals input to the analog front ends 500a, 500b, and 500c. For example, a plurality of buffers 910a, 910b, and 910c may be disposed corresponding to the plurality of analog front ends 500a, 500b, and 500c.

In the following description, it is assumed that the plurality of buffers 910a, 910b, and 910c are disposed for each of the analog front ends 500a, 500b, and 500c for convenience of description, but the disclosure is not limited thereto.

The above-described level shifter 920 and the plurality of buffers 910a, 910b, and 910c may be included in the touch driving circuit 150 (see FIG. 5).

Referring to FIG. 9, the serial control signal CR is latched inside the plurality of analog front ends 500a, 500b, and 500c and output as an individual control signal (e.g., the first control signal CR1). Accordingly, the serial control signal CR is converted into parallel individual control signals CR1, CR2, . . . , CRm by the plurality of analog front ends 500a, 500b, and 500c and then output.

The serial control signal CR below means a control signal CR output from the touch controller 160 and input to the analog front ends 500a, 500b, and 500c. The individual control signal (CR1, CR2, . . . , or CRm) means a control signal (e.g., the first control signal CR1) output from one analog front end (e.g., the first analog front end 500a).

A serial charge remover data (SCRD) circuit 900a which latches the serial control signal CR with respect to the first analog front end 500a representative of the plurality of analog front ends 500a, 500b, and 500c and outputs the latched signal and signals input to the SCRD circuit 900a are described.

In that sense, in the disclosure, the SCRD circuit 900a is also referred to as a "control signal latching circuit".

A start signal StP, a reset signal RSTB, a synchronization signal DCLK, and a control signal CR are input to the SCRD circuit 900a.

In the following description, the signals input to the SCRD circuit 900a include signals output directly from the timing controller 160 and signals output from the above-described level shifter 920 and/or buffers 910a, 910b, and 910c.

The control signal CR corresponds to data latched and output from the SCRD circuit 900a. When the serial control signal CR is input, the SCRD circuit 900a latches the control signal CR and outputs the n-bit control signal CR1[n:1] to the charge remover 560a.

The start signal StP is a signal indicating the start of each of a plurality of sensing periods. For example, the SCRD circuit 900a may detect a falling edge or a rising edge of the start signal StP and latch the control signal CR of the next sensing period.

The reset signal RSTB is a signal instructing initialization of a sensing period. For example, after sequentially sensing all of the first sensing period 1st MUX to the Nth sensing period Nth MUX, the reset signal RSTB may be input. In the SCRD circuit 900a, the sensing period is initialized, and sensing starts again from the first sensing period 1st MUX. The SCRD circuit 900a may initialize the sensing period by detecting a falling edge or a rising edge of the reset signal RSTB.

The synchronization signal DCLK is a clock signal for synchronizing the timing when the plurality of analog front ends 500a, 500b, and 500c latch the serial control signal CR. Accordingly, the plurality of analog front ends 500a, 500b, and 500c may latch the serial control signal CR according to synchronized timing.

Each of the plurality of analog front ends 500a, 500b, and 500c may include the above-described SCRD circuit 900a.

Accordingly, even when an individual control signal (e.g., the first control signal CR1) is not input to each of the plurality of analog front ends 500a, 500b, and 500c, it is possible to drive the charge remover 560 which is provided for each of the plurality of analog front ends 500a, 500b, and 500c.

Accordingly, the touch display device according to aspects of the disclosure may advantageously have a simplified wiring structure between the touch controller 160 and the plurality of analog front ends 500a, 500b, and 500c.

Further, the touch display device according to aspects of the disclosure may reduce the numbers of the level shifters 920 and the plurality of buffers 910a, 910b, and 910c positioned between the touch controller 160 and the plurality of analog front ends 500a, 500b, and 500c.

Figure 10:
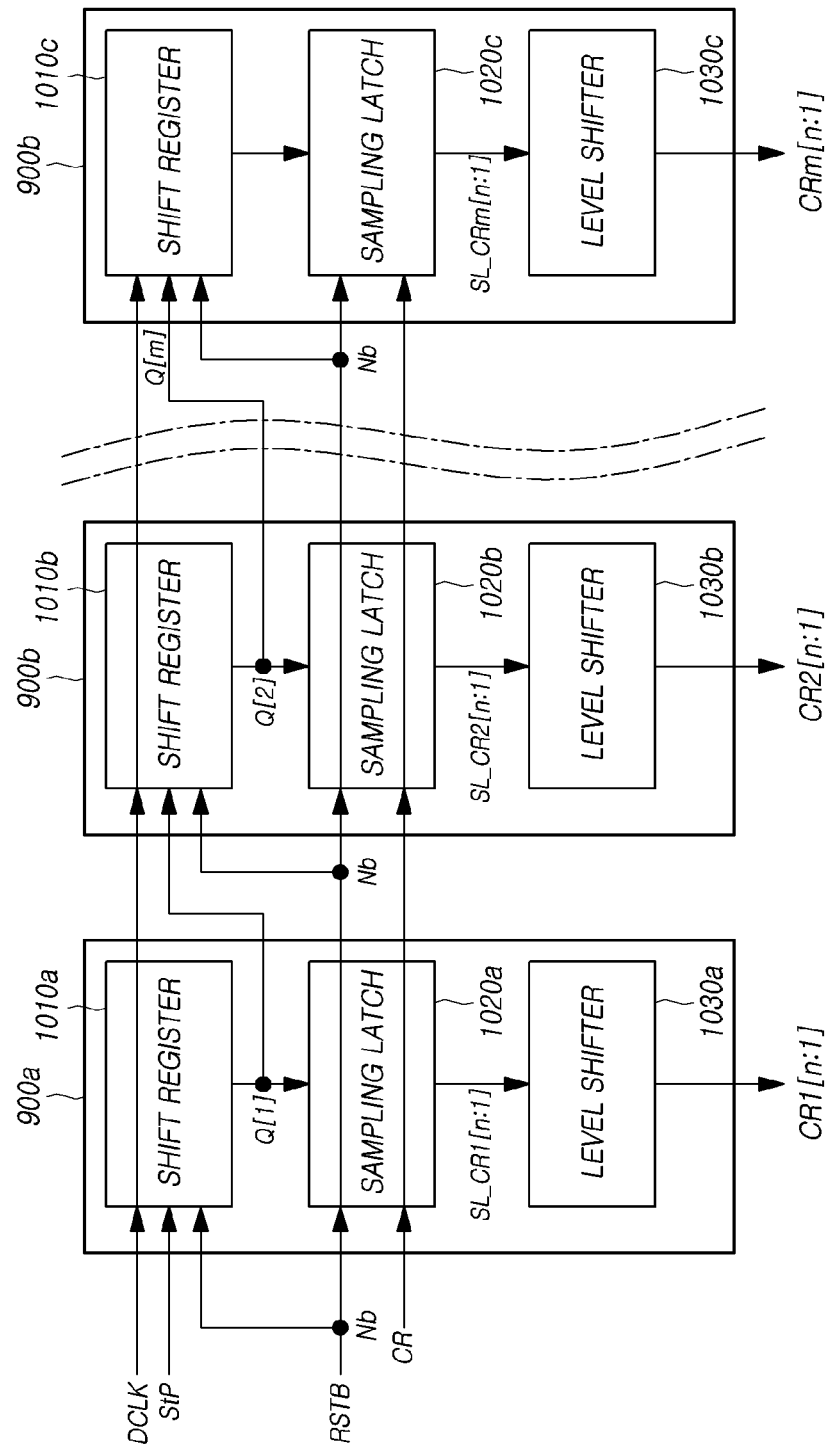
FIG. 10 is a view illustrating SCRD circuits for outputting serial charge removal signals as parallel individual control signals in a touch display device according to aspects of the present disclosure.

FIG. 10 is a view illustrating SCRD circuits 900a, 900b, and 900c for outputting serial charge removal signals as parallel individual control signals in a touch display device according to aspects of the present disclosure.

Referring to FIG. 10, the plurality of SCRD circuits 900a, 900b, and 900c according to aspects of the disclosure may respectively include shift registers 1010a, 1010b, and 1010c, first latch circuits 1020a, 1020b, and 1020c, and level shifters 1030a, 1030b, and 1030c.

The internal configuration of the SCRD circuit is described below with the first SCRD circuit 900a as a representative of the plurality of SCRD circuits 900a, 900b, and 900c.

Referring to FIG. 10, a synchronization signal DCLK, a reset signal RSTB, and a start signal StP are input to the shift register 1010a.

When the start signal StP is input to the shift register 1010a, the sensing period starts.

When the sensing period starts, the shift register 1010a detects a falling edge or a rising edge of the synchronization signal DCLK and outputs a Q node pulse Q[1].

Referring to FIG. 10, the first SCRD circuit 900a may include a terminal for outputting the Q node pulse Q[1] to the outside of the first SCRD circuit 900a.

Further, the second SCRD circuit 900b may include a terminal where the Q node pulse Q[1] output from the first SCRD circuit 900a is input. Here, the terminal where the second SCRD circuit 900b receives the Q node pulse Q[1] may correspond to the terminal where the start signal StP is input in the first SCRD circuit 900a.

The Q node pulse Q[1] output from the shift register 1010a may be input to the shift register 1010b included in another SCRD circuit (e.g., the second SCRD circuit 900b).

The Q node pulse Q[1] input to the second SCRD circuit 900b functions as the start signal StP.

In other words, the Q node pulse Q[1] is input to the second SCRD circuit 900b and functions as a signal initiating a new sensing period of the second SCRD circuit 900b.

Meanwhile, the Q node pulse Q[1] output from the shift register 1010*a* may be input to the first latch circuit 1020*a* included in the same SCRD circuit 1010*a*.

The first latch circuit 1020*a* receives the Q node pulse Q[1] and samples and stores the control signal CR according to the timing of the falling edge or rising edge of the Q node pulse Q[1]. The above-described operation of the first latch circuit 1020*a* is also referred to as "latching the control signal CR".

The first latch circuit 1020*a* outputs the sampled n-bit individual control signal SL_CR1[n:1].

The level shifter 1030*a* level-shifts the sampled n-bit individual control signal SL_CR1[n:1] and outputs the individual control signal CR1[n:1].

In some cases, the signal SL_CR1[n:1] output from the first latch circuit 1020*a* is used as the individual control signal CR1[n:1], driving the switching elements SWccr (see FIG. 6) of the charge remover. In this case, the level shifter 1030*a* inside the SCRD circuit 900*a* may be omitted.

The initialization timings of the shift register 1010*a* and the first latch circuit 1020*a* may be controlled by the same reset signal RSTB.

Referring to FIG. 10, the reset signal RSTB may be branched from the branch node Nb and be commonly input to the shift register 1010*a* and the first latch circuit 1020*a* included in the same SCRD circuit 900*a*.

The description of the first SCRD circuit 900*a* described above may be similarly applied to the second SCRD circuit 900*b* and the mth SCRD circuit 900*c*.

Accordingly, the touch display device according to aspects of the disclosure may generate a plurality of individual control signals CR1, CR2, . . . , CRm according to the serial control signal CR input to one line.

FIG. 11 is a timing diagram illustrating signals input to the SCRD circuits of FIG. 10 and signals output from the SCRD circuits.

Referring to FIG. 11, a touch sensing period when the touch synchronization signal TSYNCN is at a low level may include a preparation period SET and a sensing period SENSE.

The preparation period SET may be initiated as the start signal StP toggles. FIG. 11 illustrates an aspect in which the preparation period SET is started according to the rising edge of the start signal StP.

During the preparation period SET, the synchronization signal DCLK is toggled. During the preparation period SET, a serial control signal CR is input.

Referring to FIGS. 10 and 11 together, the above-described shift register 1010*a* detects the rising edge or the falling edge of the synchronization signal DCLK to generate and output a Q node pulse Q[1]. FIG. 11 illustrates an example in which the shift register 1010*a* detects the rising edge of the synchronization signal DCLK to detect the Q node pulse Q[1].

Referring to FIGS. 10 and 11 together, the above-described first latch circuit 1020*a* detects the rising edge or the falling edge of the Q node pulse Q[1] and samples and stores the serial control signal CR input to the first latch circuit 1020*a*.

Referring to FIG. 11, the first control signal CR1 is input at the timing at which the first latch circuit 1020*a* samples the control signal CR.

Accordingly, the first latch circuit 1020*a* may sample the first control signal CR1 and output the sampled n-bit first control signal SL_CR[n:1].

Meanwhile, the Q node pulse Q[1] output from the shift register 1010*a* is input to the shift register 1010*b* of the neighboring SCRD circuit.

The shift register 1010*b* receiving the Q node pulse Q[1] outputs the Q node pulse Q[2] according to the toggle timing of the synchronization signal DCLK.

The Q node pulse Q[2] output from the shift register 1010*b* is input to the first latch circuit 1020*b* of the corresponding SCRD circuit.

The first latch circuit 1020*b* detects the rising edge or the falling edge of the Q node pulse Q[2] and samples and stores the serial control signal CR input to the first latch circuit 1020*b*.

Referring to FIG. 11, the second control signal CR2 is input at the timing at which the first latch circuit 1020*b* samples the control signal CR.

Accordingly, the first latch circuit 1020*b* may sample the second control signal CR2 and output the sampled n-bit second control signal SL_CR[n:2].

Such an operation may be similarly performed on m SCRD circuits.

Each SCRD circuit may level-shift and output the sampled n-bit control signal.

Referring to FIG. 11, the n-bit control signals (e.g., first control signal CR1[n:1] and second control signal CR2[n:1]), which are level-shifted and output, are shown.

Accordingly, all m charge removers may operate for each of a plurality of sensing periods 1st MUX, 2nd MUX, and 3rd MUX.

In this case, the timings at which the control signal is updated for each of m charge removers may be different.

Referring to FIG. 11, both the first control signal CR1 and the second control signal CR2 are updated in the first sensing period 1st MUX, but the timings when the first control signal CR1 and the second control signal CR2 are updated may be different.

Both the first control signal CR1 and the second control signal CR2 may be updated during the preparation period SET.

Figure 12:
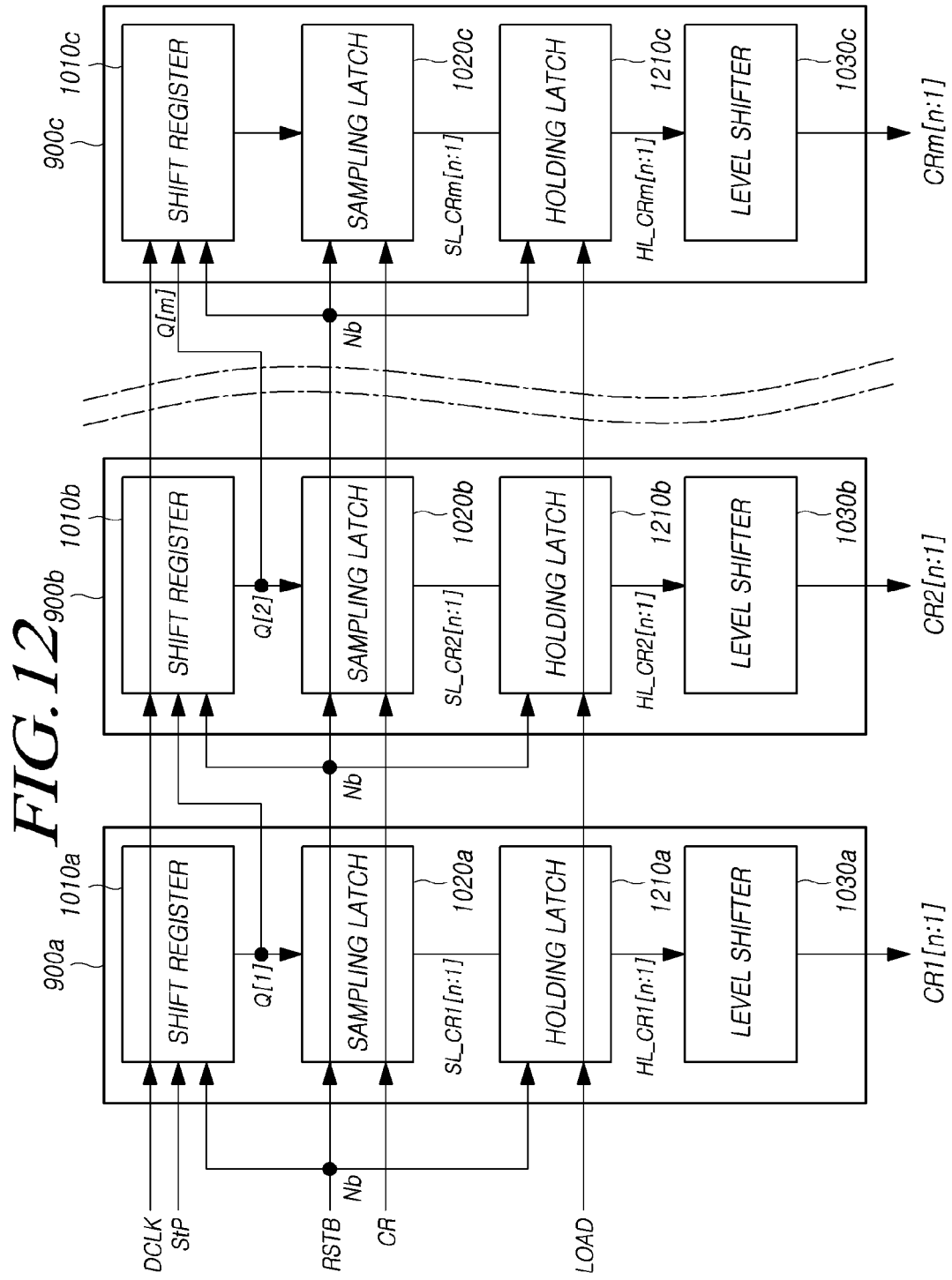
FIG. 12 is a view illustrating a case in which SCRD circuits further include second latches in a touch display device according to aspects of the present disclosure.

FIG. 12 is a view illustrating a case where the SCRD circuits 900*a*, 900*b*, and 900*c* further include second latch circuits 1210*a*, 1210*b*, and 1210*c* in the touch display device according to aspects of the present disclosure.

Referring to FIG. 12, the plurality of SCRD circuits 900*a*, 900*b*, and 900*c* may further include second latch circuits 1210*a*, 1210*b*, and 1210*c*, respectively.

The plurality of second latch circuits 1210*a*, 1210*b*, and 1210*c* receive and store signals output from the first latch circuits 1020*a*, 1020*b*, and 1020*c*, respectively.

n-bit control signals output from the first latch circuits 1020*a*, 1020*b*, and 1020*c* (e.g., the sampled first control signal SL_CR1[n:1] and the sampled second control signal SL_CR2[n:2]) are stored in the second latch circuits 1210*a*, 1210*b*, and 1210*c*.

The load signal LOAD is input to the second latch circuits 1210*a*, 1210*b*, and 1210*c*.

According to the timing when the load signal LOAD input to the second latch circuits 1210*a*, 1210*b*, and 1210*c* toggles, the stored value is output.

The plurality of second latch circuits 1210*a*, 1210*b*, and 1210*c* may receive the same load signal LOAD. In some cases, different load signals LOAD may be input to the plurality of second latch circuits 1210*a*, 1210*b*, and 1210*c*, respectively.

FIG. 12 illustrates an aspect in which the same load signal LOAD is applied to the plurality of second latch circuits 1210a, 1210b, and 1210c, but the disclosure is not limited thereto.

In sum, as the plurality of second latch circuits 1210a, 1210b, and 1210c are provided, it is possible to control the charge removers of the m analog front ends to operate in substantially the same period.

FIG. 13 is a timing diagram illustrating signals input to the SCRD circuits of FIG. 12 and signals output from the SCRD circuits.

Referring to FIG. 13, only the touch sensing period Tt is shown with respect to the touch synchronization signal TSYNCN, with the display period omitted.

A touch display device according to aspects of the disclosure may include an initialization period INITIAL as an operation period.

The initialization period INITIAL includes a period when the reset signal RSTB toggles. The initialization period INITIAL includes a period when the synchronization signal DCLK is toggled and a period when the serial control signal CR is input.

FIG. 13 illustrates a period when the touch synchronization signal TSYNCN is at a high level in the initialization period INITIAL, but the corresponding period may be a period when the touch synchronization signal TSYNCN is at a low level (i.e., the touch sensing period Tt).

Further, referring to FIG. 13, in the touch display device according to aspects of the disclosure, the touch sensing period Tt may not be divided into a preparation period SET and a sensing period SENSE.

Meanwhile, referring to FIGS. 12 and 13 described above, the first latch circuit 1020a outputs the sampled first control signal SL_CR1 during the initialization period INITIAL.

The second latch circuit 1210a receives and stores the first control signal SL_CR1.

The second latch circuit 1210a outputs the stored first control signal HL CR1 according to the toggle timing of the load signal LOAD.

The above-described operation may be commonly performed in m second latch circuits 1210a, 1210b, and 1210c.

Referring to FIGS. 12 and 13, the first control signals HL CR1, HL CR2, . . . , HL CRm output from the second latch circuits 1210a, 1210b, and 1210c may be input to the level shifters 1030a, 1030b, and 1030c, respectively. However, the level shifters 1030, 1030b, and 1030c may be omitted.

Referring to FIG. 13, m second latch circuits 1210a, 1210b, and 1210c transmit m individual control signals CR1, CR2, . . . , and CRm at substantially the same timing according to the toggle timing of the load signal LOAD.

In sum, by including the plurality of second latch circuits 1210a, 1210b, and 1210c, the touch display device according to aspects of the disclosure may control the charge removers of the m analog front ends to operate in substantially the same period.

FIG. 14 is a view briefly illustrating an effect of reducing the size of a buffer 910 in a touch display device according to aspects of the present disclosure.

Referring to FIG. 14, the buffer 910 may be configured to prevent a phase delay of signals output from the touch controller and to prevent a decrease in strength of signals output from the touch controller.

Accordingly, the number of buffers 910 required in the touch driving circuit may correspond to the product of the number n of bits of each signal and the number m of the signals.

Accordingly, when each of the m control signals CR1, CR2, . . . , CRm has a size of n bits, the number of required buffers is m×n.

Meanwhile, when an n-bit serial control signal CR is input, the number of buffers 910 required is n.

Further, the start signal StP, the reset signal RSTB, the synchronization signal DCLK, and the load signal LOAD are toggled pulses, and the number of buffers required for each of the signals is one.

In other words, the number of buffers 910 required to generate individual control signals CR1[n:1], CR2[n:1], CRm[n:1] by receiving the n-bit serial control signal CR[n:1] as a control signal CR is reduced to n+4.

Accordingly, the number of buffers 910 is not affected by the number m of analog front ends.

The feature of simplifying the circuit configuration is likewise applied to the level shifter 920 (see FIG. 9) positioned between the touch controller and the analog front end.

Therefore, according to the touch display device according to aspects of the disclosure, it is possible to simplify the wiring structure between the touch controller and the analog front end and the circuit configuration of the buffer 910 positioned between the touch controller and the analog front end and the circuit configuration of the level shifter 920.

Figure 15:
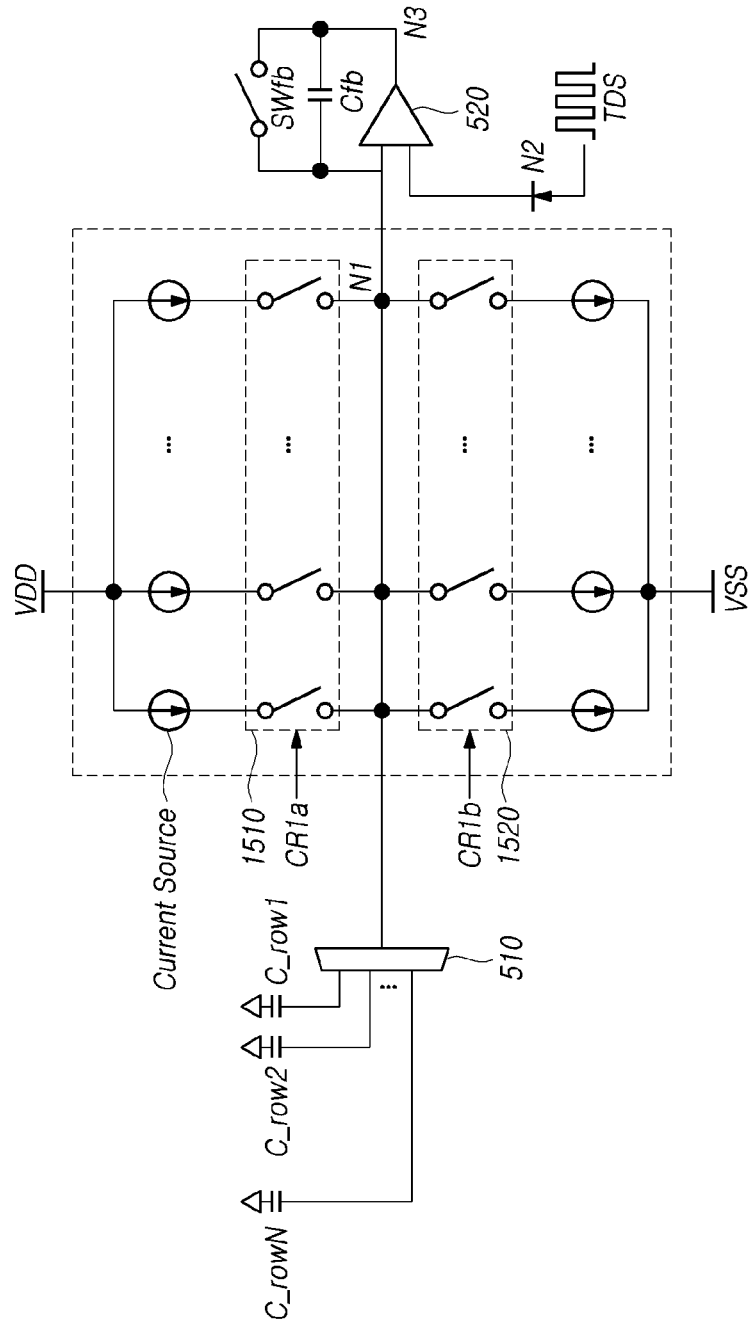
FIG. 15 is a view illustrating an example where a charge remover includes a switched-current source array in a touch display device according to aspects of the present disclosure.

FIG. 15 is a view illustrating an example where a charge remover 560 includes a switched-current source array in a touch display device according to aspects of the present disclosure.

Referring to FIG. 15, an aspect in which charge remover 560 includes a switched-current source array is shown.

Referring to FIG. 15, the charge remover 560 includes a plurality of current sources.

A first driving voltage VDD or a second driving voltage VSS is applied to one end of the plurality of current sources.

The voltage level of the first driving voltage VDD may be higher than the voltage level of the second driving voltage VSS. The second driving voltage VSS may be a ground voltage.

A switching element is electrically connected to the other end of each of the plurality of current sources. The switching element switches an electrical connection between the current source and the first input terminal N1 of the operational amplifier 520.

When the switching element electrically connected to the other end of the switching element is turned on, current flows in a preset direction.

Two or more switching elements may constitute the switching element arrays 1510 and 1520.

When the switching elements included in the first switching element array 1510 are turned on, current flows in the direction of being input to the first input terminal N1 of the operational amplifier 520. In other words, the first input terminal N1 of the operational amplifier 520 may be charged.

When the switching elements included in the second switching element array 1520 are turned on, current flows in the direction of being output from the first input terminal N1 of the operational amplifier 520. In other words, the first input terminal N1 of the operational amplifier 520 may be discharged.

The operation timing of the first switching element array 1510 may be controlled by the 1ath control signal CR1a.

The operation timing of the second switching element array 1520 may be controlled by the 1bth control signal CR1b.

The 1ath control signal CR1a for controlling the operation timing of the first switching element array 1510 may be an individual control signal generated by latching the serial control signal CRa (corresponding to the above-described control signal CR).

The 1bth control signal CR1b for controlling the operation timing of the second switching element array 1520 may be an individual control signal generated by latching the serial control signal CRb (corresponding to the above-described control signal CR).

Accordingly, the touch display device according to aspects of the disclosure has an advantage in that configuration of lines, buffers, and level shifters is simplified even when the charge remover 560 including the switched-current source array is provided.

Meanwhile, the 1ath control signal CR1a and the 1bth control signal CR1b may be independently formed signals. In some cases, the 1bth control signal CR1b may be configured as an inverse-phase signal of the 1ath control signal CR1a.

When the 1bth control signal CR1b is an inverse-phase signal of the 1ath control signal CR1a, the serial control signal CRb for generating the 1bth control signal CR1b may be generated by the touch driving circuit.

For example, the touch driving circuit may include an inverter (not shown), and a serial control signal CRa for generating the 1ath control signal CR1a may be input to the inverter. The signal output from the inverter is an inverse-phase signal of the serial control signal CRa for generating the 1ath control signal CR1a and may be used as the serial control signal CRb for generating the 1bth control signal CR1b.

Thus, it is possible to further simplify the wiring structure of the charge remover 560 including the switched-current source.

Figure 16:
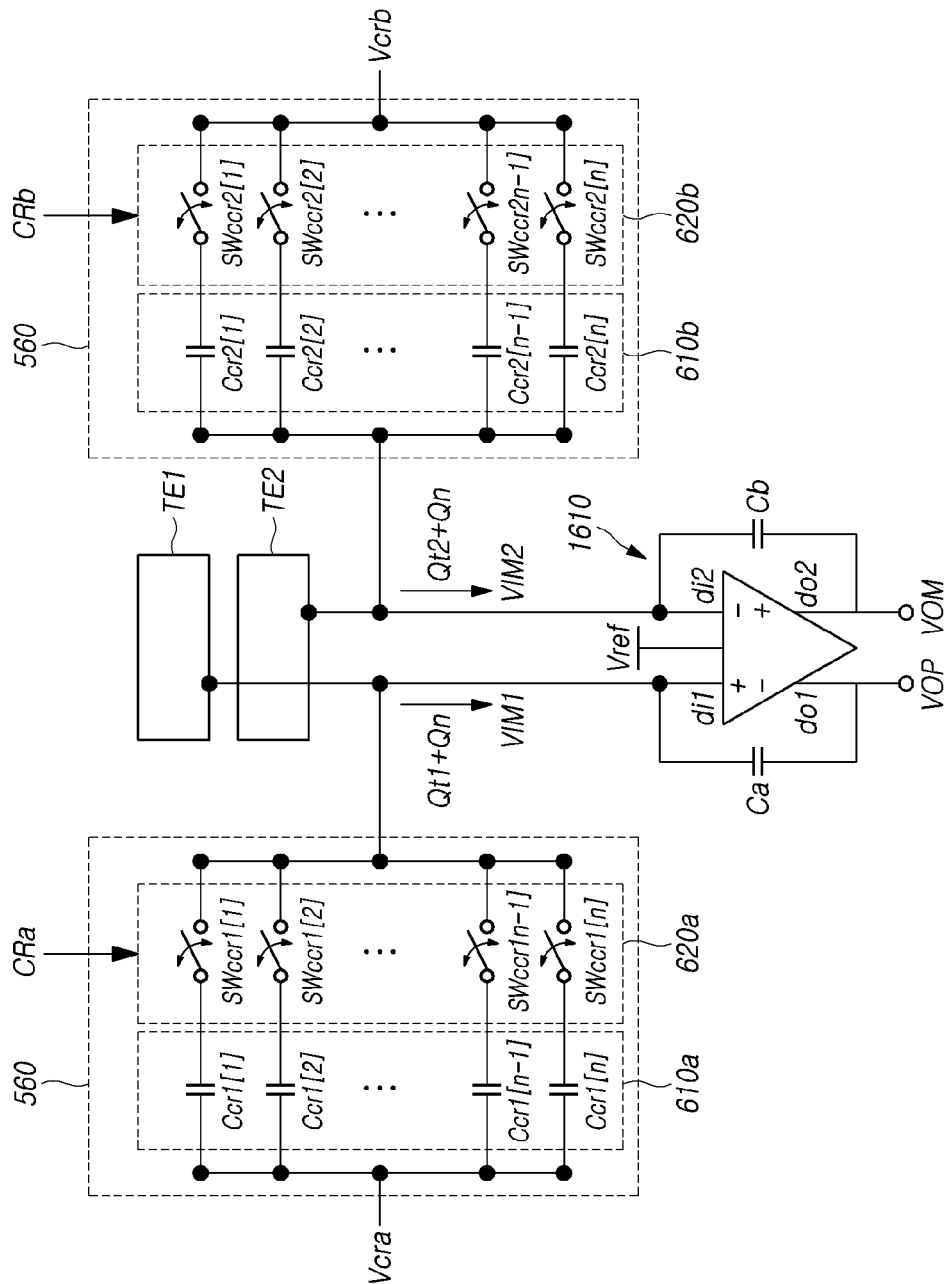
FIG. 16 is a view illustrating an example where a charge remover operates in a differential manner in a touch display device according to aspects of the present disclosure.

FIG. 16 is a view illustrating a control signal input to a charge remover 560 when a touch display device according to aspects of the disclosure senses a touch input in a differential sensing method.

Referring to FIG. 16, a touch display device according to aspects of the disclosure may include a differential amplifier 1610 for differentially sensing two common electrodes TE.

The differential amplifier 1610 may be included in the above-described touch driving circuit 150. The differential amplifier 1610 may be included in the above-described analog front end 500.

Referring to FIG. 16, the differential amplifier 1610 receives a first input signal VIM1 and a second input signal VIM2 from the first touch electrode TE1 and the second touch electrode TE2, respectively, through the first input end di1 and the second input end di2.

The differential amplifier 1610 may differentially amplify the first input signal VIM1 and the second input signal VIM2 and output the first output signal VOP through the first output end do1 and the second output signal VOM through the second output end do2.

The differential amplifier 1610 performs differential amplification to output a first output signal VOP and a second output signal VOM having a difference proportional to the difference between the first input signal VIM1 and the second input signal VIM2.

In the differential amplifier 1610, a first capacitor Ca may be electrically connected between the first input end di1 and the first output end do1, and a second capacitor Cb may be electrically connected between the second input end di2 and the second output terminal do2.

The first touch electrode TE1 and the second touch electrode TE2, which are subject to differential sensing, may be positioned to overlap with the same signal line (e.g., data line, gate line, etc.). For example, the first touch electrode TE1 and the second touch electrode TE2 may be touch electrodes TE positioned to overlap with the same data line.

When a touch input is sensed by a differential sensing method, it is possible to provide a touch display device more robust against noise Qn. In particular, when the touch input is sensed by the differential sensing method, it is possible to sense the touch input by more effectively remove the noise Qn caused by the signal line (e.g., data line or gate line) positioned to commonly overlap with the first touch electrode TE1 and the second touch electrode TE2.

For example, when the first touch electrode TE1 and the second touch electrode TE2 are positioned to overlap with the same data line, the noise Qn caused from the corresponding data line may be identical in the first touch electrode TE1 and the second touch electrode TE2.

In the following description, it is assumed that the noise Qn common to the first touch electrode TE1 and the second touch electrode TE2 is formed by the signal input to the data line, but the disclosure is limited thereto.

Accordingly, the first input signal VIM1 input to the first input end di1 of the differential amplifier 1610 is a signal corresponding to the combined charge Qt1+Qn of the touch charge Qt1 generated from the first touch electrode TE1 and the noise charge Qn generated by the data line. Further, the second input signal VIM2 input to the second input end di2 of the differential amplifier 1610 is a signal corresponding to the touch charge Qt2 generated from the second touch electrode TE2 and the noise charge Qn generated by the data line.

The differential amplifier 1610 may differentially amplify the signals input to the first input end di1 and the second input end di2 and output the signals to the first output end do1 and the second output end do2.

The differential amplifier 1610 differentially amplifies and outputs input signals based on the reference voltage Vref. The reference voltage Vref may be applied as a ground voltage that is a DC voltage and may also be applied as a toggling AC voltage.

Meanwhile, referring to FIG. 16, the signal VIM1 corresponding to the touch charge Qt1 generated from the first touch electrode TE1 and the noise charge Qn is input to the first input stage di1 of the differential amplifier 1610, so that if the touch electrode subject to sensing is changed, the charge of the first input end di1 should be removed.

Likewise, the signal VIM2 corresponding to the touch charge Qt2 generated from the second touch electrode TE2 and the noise charge Qn is input to the second input stage di2 of the differential amplifier 1610, so that if the touch electrode subject to sensing is changed, the charge of the second input end di2 should be removed.

Accordingly, the charge remover 560 may be electrically connected to each of the first input end di1 and the second input end di2 of the differential amplifier 1610.

The charge remover 560 that removes charge of the first input end di1 may include a switched-capacitor array. The switched-capacitor array may include a first capacitor array 610a and a first switching element array 620a. The first switching element array 620a may be controlled by the control signal CRa. The first charge removal pulse voltage Vcra may be input to the charge remover 560.

The charge remover 560 that removes charge of the second input end di2 may include a switched-capacitor array. The switched-capacitor array may include a second capacitor array 610b and a second switching element array 620b. The second switching element array 620b may be controlled by the control signal CRb. The second charge removal pulse voltage Vcrb may be input to the charge remover 560.

The first charge removal pulse voltage Vcra and the second charge removal pulse voltage Vcrb may be in-phase signals, inverse-phase signals, or independent signals.

A specific configuration of the charge remover 560 has been described above, and no duplicate description thereof is thus given below.

Referring to FIG. 16, the operation timing of the charge remover 560 electrically connected to the first input end di1 of the differential amplifier 1610 may be controlled by the control signal CRa. The control signal CRa may be the above-described individual control signal.

Further, referring to FIG. 16, the operation timing of the charge remover 560 electrically connected to the second input end di2 of the differential amplifier 1610 may be controlled by the control signal CRb. The control signal CRb may be the above-described individual control signal.

For example, the control signal CRa for removing the charge of the first input end di1 of the differential amplifier 1610 and the control signal CRb for removing the charge of the second input end di2 of the differential amplifier 1610 may be inverse-phase signals.

When these two control signals CRa and CRb are in an inverse phase relationship with each other, the control signal CRb for removing the charge of the second input di2 may be generated from the control signal CRa for removing the charge of the first input di1.

For example, the control signal CRb for removing the charge of the second input end di2 may be a signal produced by inputting the control signal CRa for removing the charge of the first input end di1 to the inverter (not shown).

Further, for example, the control signal CRb for removing the charge of the second input end di2 may be a signal obtained by inputting the control signal CRa for removing the charge of the first input end di1 to the buffer to delay phase.

In the above-described example, the control signal CRb for removing the charge of the second input end di2 is generated based on the control signal CRa for removing the charge of the first input end di1, but the opposite case may also apply.

Accordingly, to remove charge of the first input end di1 and the second input end di2 of the differential amplifier 1610, a single serial control signal CR may be received from the above-described touch controller 160.

Accordingly, the touch display device according to aspects of the disclosure may have a simplified wiring structure and robustness to noise signals.

Further, as an example, the control signal CRa for removing the charge of the first input end di1 of the differential amplifier 1610 and the control signal CRb for removing the charge of the second input end di2 of the differential amplifier 1610 may be independently generated signals.

Accordingly, a single control signal CR for removing the charge of the first input end di1 of the differential amplifier 1610 and a single control signal CR for removing the charge of the second input end di2 of the differential amplifier 1610 may be received from the touch controller 160.

Accordingly, the touch display device according to aspects of the disclosure may have a simplified wiring structure and robustness to noise signals.

Further, as an example, either the control signal CRa for removing the charge of the first input end di1 or the control signal CRb for removing the charge of the second input end di2 may be "0," that is, it may have a value that turns off all of the n switching elements in the charge remover.

In this case, a single input-based sensing method, rather than the differential sensing method, may be implemented.

The above-described differential sensing touch sensing method may likewise apply to the aspect (described above in connection with FIG. 15) where the touch charge remover has a switched-current source array.

Accordingly, the touch display device according to aspects of the disclosure may perform sensing by both a differential sensing method and a single input method while further simplifying the wiring structure.

In summary, the touch display device 100 according to aspects of the disclosure may control two or more charge removers 560a, 560b, and 560c through a simplified wiring structure.

Further, in the touch display device 100 according to aspects of the disclosure, a serial control signal CR may be input from the touch controller 160 to the touch driving circuit 150 through one line at high speed. Accordingly, even when compared to the case where the individual control signals CR1, CR2, . . . , CRm are output from the touch controller 160, the touch display device 100 according to aspects of the disclosure is not disadvantageous in terms of communication speed.

For example, the touch display device 100 according to aspects of the disclosure includes two or more charge removers 560a, 560b, and 560c that operate every sensing period 1st MUX, 2nd MUX, . . . , Nth MUX.

Accordingly, the touch display device 100 according to aspects of the disclosure may control two or more charge removers 560a, 560b, and 560c at high speed while having a simplified wiring structure.

Aspects of the disclosure described above are briefly described below.

Aspects of the disclosure may provide an analog front end 500 comprising a multiplexer circuit 510 including two or more input ends, to which a voltage (e.g., the touch sensing signal TSS) is applied from one or more touch electrodes TE disposed on a touchscreen panel TSP, and at least one output end, an operational amplifier 520 including a first input terminal N1 to which a voltage output from the output end of the multiplexer is applied, a charge remover 560 including a switched-capacitor array electrically connected with the first input terminal N1 of the operational amplifier 520 and discharging electric charge of the first input terminal N1 of the operational amplifier 520, and a control signal latching circuit 900 receiving a start signal StP and a synchronization signal DCLK to generate a pulse (e.g., Q node pulse Q[1], Q[2], . . . , Q[m]) and latching a received serial signal CR according to the pulse to generate and output an individual control signal CR1, CR2, . . . , CRm of the switched-capacitor array.

Aspects of the disclosure may provide the analog front end 500, wherein the control signal latching circuit includes a shift register 1010 receiving the start signal StP and the synchronization signal DCLK to generate and output the pulse (e.g., Q node pulse Q[1], Q[2], . . . , Q[m]), and a first latch circuit 1020 detecting a rising edge or a falling edge of the pulse (e.g., Q node pulse Q[1], Q[2], . . . , Q[m]) to latch the serial signal CR.

Aspects of the disclosure may provide the analog front end 500, wherein the shift register 1010 further includes a Q node, and wherein the Q node is electrically connected to an input end of the first latch circuit 1020 and an external output terminal of the analog front end 500.

Aspects of the disclosure may provide the analog front end 500, wherein the control signal latching circuit 900 includes a second latch circuit 1210 storing and outputting a signal output from the first latch circuit 1020.

Aspects of the disclosure may provide the analog front end 500, wherein a period between the rising edge and the falling edge of the start signal StP is equal to a period between the rising edge and the falling edge of the pulse Q[1], Q[2], . . . , Q[m].

Aspects of the disclosure may provide a touch display device 100 comprising a touchscreen panel TSP on which a plurality of touch electrodes TE are disposed, a touch driving circuit 150 sensing the plurality of touch electrodes TE, and a touch controller 160 controlling a driving timing of the touch driving circuit 150, wherein the touch driving circuit 150 further includes a multiplexer circuit 510 including two or more input ends, to which a voltage (e.g., the touch sensing signal TSS) is applied from one or more touch electrodes TE among the plurality of touch electrodes TE, and at least one output end, an operational amplifier 520 including a first input terminal N1 to which a voltage output from the output end of the multiplexer is applied, a charge remover 560 including a switched-capacitor array electrically connected with the first input terminal N1 of the operational amplifier 520 and discharging electric charge of the first input terminal N1 of the operational amplifier 520, and a control signal latching circuit 900 receiving a start signal StP and a synchronization signal DCLK to generate a pulse (e.g., Q node pulse Q[1], Q[2], . . . , Q[m]) and latching a received serial signal CR according to the pulse to generate and output an individual control signal CR1, CR2, . . . , CRm of the switched-capacitor array.

Aspects of the disclosure may provide the touch display device 100, wherein the serial signal CR is a serial control signal output from the touch controller 160, and wherein the touch controller 160 outputs the serial control signal through one line.

Aspects of the disclosure may provide the touch display device 100, wherein the touch driving circuit 150 includes m (m≥2) analog front ends 500, and wherein each of the m analog front ends 500 includes the multiplexer circuit 510, the operational amplifier 520, the charge remover 560, and the control signal latching circuit 900.

Aspects of the disclosure may provide the touch display device 100, wherein signals for controlling m charge removers 560 are all output through the one line.

Aspects of the disclosure may provide the touch display device 100, wherein the switched-capacitor array includes a capacitor array 610 including n (n≥2) capacitor elements, and a switching element array 620 including n switching elements configured to control charging and discharging of each of the n capacitor elements, and wherein a size of the individual control signal CR1, CR2, . . . , CRm is n bits.

Aspects of the disclosure may provide the touch display device 100, wherein the touch driving circuit 150 includes n buffers 910 receiving the serial control signal CR.

Aspects of the disclosure may provide the touch display device 100, wherein the touch driving circuit 150 includes n level shifters 920 receiving the serial control signal CR.

Aspects of the disclosure may provide the touch display device 100, wherein the pulse output from the Q node of the shift register is input to a start signal input terminal of any one analog front end 500 among the m analog front ends.

Aspects of the disclosure may provide an analog front end 500 comprising a multiplexer circuit 510 including two or more input ends, to which a voltage is applied from one or more touch electrodes TE disposed on a touchscreen panel TSP, and at least one output end, an operational amplifier 520 including a first input terminal N1 to which a voltage output from the output end of the multiplexer is applied, a charge remover 560 including a switched-current source array electrically connected with the first input terminal N1 of the operational amplifier 520 and discharging electric charge of the first input terminal N1 of the operational amplifier 520, and a control signal latching circuit 900 receiving a start signal StP and a synchronization signal DCLK to generate a pulse (e.g., Q node pulse Q[1], Q[2], . . . , Q[m]) and latching a received serial signal CR according to the pulse to generate and output an individual control signal CR1, CR2, . . . , CRm of the switched-capacitor array.

The above description has been presented to enable any person skilled in the art to make and use the technical idea of the disclosure, and has been provided in the context of a particular application and its requirements. Various modifications, additions and substitutions to the described aspects will be readily apparent to those skilled in the art, and the general principles defined herein may be applied to other aspects and applications without departing from the spirit and scope of the disclosure. The above description and the accompanying drawings provide an example of the technical idea of the disclosure for illustrative purposes only. That is, the disclosed aspects are intended to illustrate the scope of the technical idea of the disclosure.

What is claimed:

1. An analog front end, comprising:
    a multiplexer circuit including two or more input ends, to which a voltage is applied from one or more touch electrodes disposed on a touchscreen panel, and at least one output end;
    an operational amplifier including a first input terminal to which a voltage output from the output end of the multiplexer is applied;
    a charge remover including a switched-capacitor array electrically connected with the first input terminal of the operational amplifier and discharging electric charge of the first input terminal of the operational amplifier; and
    a control signal latching circuit receiving a start signal and a synchronization signal to generate a pulse, latching a received serial signal according to the pulse, and generating and outputting an individual control signal of the switched-capacitor array.

2. The analog front end of claim 1, wherein the control signal latching circuit includes:
    a shift register receiving the start signal and the synchronization signal and generating and outputting the pulse; and
    a first latch circuit detecting a rising edge or a falling edge of the pulse and latching the serial signal.

3. The analog front end of claim 2, wherein the shift register further includes a Q node, and
    wherein the Q node is electrically connected to an input end of the first latch circuit and an external output terminal of the analog front end.

4. The analog front end of claim 2, wherein the control signal latching circuit includes a second latch circuit storing and outputting a signal output from the first latch circuit.

5. A touch display device, comprising:
    a touchscreen panel on which a plurality of touch electrodes are disposed;
    a touch driving circuit sensing the plurality of touch electrodes; and
    a touch controller controlling a driving timing of the touch driving circuit, wherein the touch driving circuit further includes:
a multiplexer circuit including two or more input ends, to which a voltage is applied from one or more touch electrodes among the plurality of touch electrodes, and at least one output end;
an operational amplifier including a first input terminal to which a voltage output from the output end of the multiplexer is applied;
a charge remover including a switched-capacitor array electrically connected with the first input terminal of the operational amplifier and discharging electric charge of the first input terminal of the operational amplifier; and
a control signal latching circuit receiving a start signal and a synchronization signal to generate a pulse, latching a received serial signal according to the pulse and generating and outputting an individual control signal of the switched-capacitor array.

6. The touch display device of claim 5, wherein the serial signal is a serial control signal output from the touch controller, and
wherein the touch controller outputs the serial control signal through one line.

7. The touch display device of claim 6, wherein the touch driving circuit includes m analog front ends (m being an integer larger than or equal to 2), and
wherein each of the m analog front ends includes the multiplexer circuit, the operational amplifier, the charge remover, and the control signal latching circuit.

8. The touch display device of claim 7, wherein signals for controlling m charge removers are all output through one line.

9. The touch display device of claim 6, wherein the switched-capacitor array includes:
a capacitor array including n capacitor elements (n being an integer larger than or equal to 2); and
a switching element array including n switching elements configured to control charging and discharging of each of the n capacitor elements, and wherein a size of the individual control signal is n bits.

10. The touch display device of claim 9, wherein the touch driving circuit includes n buffers receiving the serial control signal.

11. The touch display device of claim 9, wherein the touch driving circuit includes n level shifters receiving the serial control signal.

12. The touch display device of claim 5, wherein the control signal latching circuit includes:
a shift register receiving the start signal and the synchronization signal and generating and outputting the pulse; and
a first latch circuit detecting a rising edge or a falling edge of the pulse to latch the serial signal.

13. The touch display device of claim 12, wherein the shift register further includes a Q node, and
wherein the Q node is electrically connected to an input end of the first latch circuit and an external output terminal of the analog front end.

14. The touch display device of claim 13, wherein the pulse output from the Q node of the shift register is input to a start signal input terminal of any one of the m analog front ends.

15. An analog front end, comprising:
a multiplexer including two or more input ends, to which a voltage is applied from one or more touch electrodes disposed on a touchscreen panel, and at least one output end;
an operational amplifier including a first input terminal discharging electric charge of the first input terminal of the operational amplifier;
a charge remover including a switched-current source array electrically connected with the first input terminal of the operational amplifier and discharging electric charge of the first input terminal of the operational amplifier; and
a control signal latching circuit receiving a start signal and a synchronization signal to generate a pulse and latching a received serial signal according to the pulse and generating and outputting an individual control signal of the switched-current source array.

* * * * *